United States Patent
Sudeji

(10) Patent No.: US 10,338,291 B2
(45) Date of Patent: Jul. 2, 2019

(54) MULTILAYER FILM, POLARIZATION PLATE, AND MULTILAYER FILM PRODUCTION METHOD

(71) Applicant: ZEON CORPORATION, Tokyo (JP)

(72) Inventor: Hironari Sudeji, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/107,041

(22) PCT Filed: Dec. 24, 2014

(86) PCT No.: PCT/JP2014/084132
§ 371 (c)(1),
(2) Date: Jun. 21, 2016

(87) PCT Pub. No.: WO2015/098956
PCT Pub. Date: Jul. 2, 2015

(65) Prior Publication Data
US 2017/0038510 A1 Feb. 9, 2017

(30) Foreign Application Priority Data

Dec. 27, 2013 (JP) ................................ 2013-271974

(51) Int. Cl.
| | | |
|---|---|---|
| B32B 7/02 | (2019.01) | |
| G02B 5/30 | (2006.01) | |
| B29C 48/08 | (2019.01) | |
| B29C 48/88 | (2019.01) | |
| B29C 55/08 | (2006.01) | |
| B32B 27/08 | (2006.01) | |
| B29D 11/00 | (2006.01) | |
| B05D 1/28 | (2006.01) | |
| B05D 3/14 | (2006.01) | |
| B29C 55/02 | (2006.01) | |
| G02F 1/1335 | (2006.01) | |
| G02F 1/13363 | (2006.01) | |
| B32B 27/30 | (2006.01) | |
| B32B 27/32 | (2006.01) | |
| C09D 175/06 | (2006.01) | |
| C08G 18/44 | (2006.01) | |
| B29K 675/00 | (2006.01) | |
| B29L 7/00 | (2006.01) | |
| B29L 9/00 | (2006.01) | |

(52) U.S. Cl.
CPC ............. *G02B 5/3083* (2013.01); *B05D 1/28* (2013.01); *B05D 3/144* (2013.01); *B29C 48/08* (2019.02); *B29C 48/9135* (2019.02); *B29C 55/023* (2013.01); *B29C 55/08* (2013.01); *B29D 11/0073* (2013.01); *B32B 27/08* (2013.01); *B32B 27/306* (2013.01); *B32B 27/325* (2013.01); *C08G 18/44* (2013.01); *C09D 175/06* (2013.01); *G02B 5/305* (2013.01); *G02B 5/3033* (2013.01); *G02F 1/13363* (2013.01); *G02F 1/133528* (2013.01); *B05D 2201/02* (2013.01); *B05D 2503/00* (2013.01); *B29K 2675/00* (2013.01); *B29L 2007/008* (2013.01); *B29L 2009/005* (2013.01); *B32B 2255/10* (2013.01); *B32B 2255/26* (2013.01); *B32B 2307/42* (2013.01); *B32B 2307/51* (2013.01); *B32B 2307/514* (2013.01); *B32B 2457/202* (2013.01); *G02F 2001/133638* (2013.01); *G02F 2202/28* (2013.01); *G02F 2413/01* (2013.01); *G02F 2413/05* (2013.01)

(58) Field of Classification Search
CPC . B29C 47/0021; B29C 47/884; B29C 55/023; B29C 55/08; B29D 11/0073; B32B 2307/42; B32B 2307/51; B32B 2457/202; B32B 27/08; B32B 27/40; G02B 5/3033; G02B 5/305; G02B 5/3083
See application file for complete search history.

(56) References Cited

FOREIGN PATENT DOCUMENTS

| | | |
|---|---|---|
| JP | 2008-297376 A | 12/2008 |
| JP | 2009-241283 A | 10/2009 |
| JP | 2012-177890 A | 9/2012 |
| JP | 2012-206343 A | 10/2012 |

OTHER PUBLICATIONS

Apr. 7, 2015 Written Opinion in International Patent Application No. PCT/JP2014/084132.
Apr. 7, 2015 International Search Report issued in International Patent Application No. PCT/JP2014/084132.
Jul. 27, 2017 Search Report issued in European Patent Application No. 14873281.1.

*Primary Examiner* — Lawrence D Ferguson
(74) *Attorney, Agent, or Firm* — Oliff PLC

(57) ABSTRACT

A multilayer film including: an A layer composed of a thermoplastic resin; and a B layer disposed on at least one of the surfaces of the A layer, the B layer being composed of a material Y that contains as a main component a polymer having a glass transition temperature of −50 to 40° C., and a thickness Ta of the A layer, a thickness Tb of the B layer, a planar orientation coefficient P of the A layer, a loss modulus Ea″ of the A layer, a loss modulus Eb″ of the B layer, a storage modulus Ea′ of the A layer, and a storage modulus Eb′ of the B layer satisfying following formulae (1) to (4):

$$2.5 \times 10^{-3} < Tb/Ta < 1.0 \times 10^{-1} \quad (1)$$

$$P > 1.0 \times 10^{-3} \quad (2)$$

$$Eb'' > Ea'' + 0.01 \text{ GPa} \quad (3)$$

$$Eb' < Ea' - 1 \text{ GPa}. \quad (4)$$

8 Claims, No Drawings

MULTILAYER FILM, POLARIZATION PLATE, AND MULTILAYER FILM PRODUCTION METHOD

FIELD

The present invention relates to a multilayer film, a polarization plate, a liquid crystal display device, and a method for producing a multilayer film, and more particularly, to a multilayer film, a polarization plate, a liquid crystal display device, and a method for producing the multilayer film that realize sufficient adhesiveness over the entire surface and efficient production.

BACKGROUND

In liquid crystal display devices, phase-difference films are widely used for compensating the phase-difference caused by birefringence of the liquid crystal cell. Many phase-difference films with a variety of configurations have been hitherto proposed. From the viewpoint of productivity and cost efficiency, stretched films are widely used as the phase-difference films that are produced by causing orientation of a transparent resin by stretching to exhibit birefringence. Examples of such stretched films may include films made of triacetylcellulose, which are advantageous in costs and productivity, and films made of polycarbonate resins, which have a good heat resistance. Recently, phase-difference films that contain polymers having alicyclic structures are drawing attention because of good heat resistant, low moisture absorption, and low photoelasticity properties.

However, the stretched alicyclic polymer-containing phase-difference films do not always exhibit a sufficient level of adhesiveness (adhesion strength) to polarizers, particularly those made of polyvinyl alcohol (PVA), compared to phase-difference films made of conventionally used materials.

To solve the aforementioned problem, a variety of efforts have been made. For example, surface treatments such as corona treatment are conducted on the surface of the phase-difference films or modifications are made to compositions of adhesive agents. Despite these efforts, satisfying results have not been obtained. According to the studies by the inventors, the aforementioned insufficiency in adhesion strength is due to cohesive fracture that occurs in a part near the top surface of the film. When a film that contains a polymer having an alicyclic structure as the main component is stretched to form a phase-difference film, the polymers are oriented and the molecular entanglements are reduced, thereby causing such cohesive fracture.

However, birefringence caused by molecular orientation is an essential property for a phase-difference film. Thus, it has been difficult to secure cohesive fracture durability while exhibiting birefringence. Addressing to this issue, e.g., Patent Literature 1 discloses a technique in which a certain solvent is applied onto a surface of a film that has been oriented by stretching so that the orientation on the film surface is relaxed and the adhesiveness of the film to the polarizer is improved.

CITATION LIST

Patent Literature

Patent Literature 1: Japanese Patent Application Laid-open No. 2012-177890 A

SUMMARY

Technical Problem

According to the method disclosed in Patent Literature 1, the solvent applied onto the film is volatilized, and no layer is formed on the film surface. Thus, it is difficult to determine whether the solvent is uniformly applied onto the entire film surface, which makes it difficult to efficiently produce a film having good adhesiveness over the entire surface.

The present invention has been made to solve the aforementioned problem, and it is an object of the present invention to provide a multilayer film, a polarization plate, a liquid crystal display device, and a method for producing the multilayer film that realize sufficient adhesiveness over the entire surface and efficient production.

Solution to Problem

The inventors have conducted studies to solve the aforementioned problem, and found out that a multilayer film having good adhesiveness can be obtained by forming a resin layer that contains a polymer having a certain viscoelasticity and a glass transition point on a surface of a base thermoplastic resin film (A layer) with a thickness within a certain range relative to the thickness of the A layer.

According to the present invention, inventions of the following <1> to <10> are provided.

<1> A multilayer film comprising: an A layer composed of a thermoplastic resin; and a B layer disposed on at least one of the surfaces of the A layer, the B layer being composed of a material Y that contains as a main component a polymer having a glass transition temperature of −50 to 40° C., and a thickness Ta of the A layer, a thickness Tb of the B layer, a planar orientation coefficient P of the A layer, a loss modulus Ea' of the A layer, a loss modulus Eb' of the B layer, a storage modulus Ea' of the A layer, and a storage modulus Eb' of the B layer satisfying following formulae (1) to (4):

$$2.5 \times 10^{-3} < Tb/Ta < 1.0 \times 10^{-1} \quad (1)$$

$$P > 1.0 \times 10^{-3} \quad (2)$$

$$Eb'' > Ea'' + 0.01 \text{ GPa} \quad (3)$$

$$Eb' < Ea' - 1 \text{ GPa}. \quad (4)$$

<2> The multilayer film according to <1> above, wherein the thermoplastic resin contains a polymer having an alicyclic structure.

<3> The multilayer film according to <1> or <2> above, wherein the polymer contained in the material Y is a polyurethane.

<4> The multilayer film according to <3> above, wherein the polyurethane has a carbonate structure in the skeleton structure thereof.

<5> The multilayer film according to any one of <1> to <4> above, wherein the multilayer film has a two-layer structure having only one A layer and only one B layer.

<6> The multilayer film according to any one of <1> to <5> above, wherein the material Y is an aqueous emulsion substantially containing no organic solvent.

<7> A polarization plate comprising: the multilayer film according to any one of <1> to <6> above; and a polarizer film that contains a polyvinyl alcohol.

<8> The polarization plate according to <7> above, wherein the polarizer film, the B layer, and the A layer are disposed in this order.

<9> A method for producing a multilayer film, the method comprising: a step of forming a layer 2 with a material Y on a surface of a layer 1 composed of a thermoplastic resin, the material Y containing as a main component a polymer having a glass transition temperature of −50 to 40° C., to thereby form a multilayer film substrate; and a stretching step of stretching the multilayer film substrate to form a multilayer film that includes an A layer that is the layer 1 after stretching and a B layer that is the layer 2 after stretching, a thickness Ta of the A layer, a thickness Tb of the B layer, a planar orientation coefficient P of the A layer, a loss modulus $Ea'$ of the A layer, and a loss modulus $Eb'$ of the B layer satisfying, after the stretching step, following formulae (1) to (4):

$$2.5 \times 10^{-3} < Tb/Ta < 1.0 \times 10^{-1} \quad (1)$$

$$P > 1.0 \times 10^{-3} \quad (2)$$

$$Eb'' > Ea'' + 0.01 \text{ GPa} \quad (3)$$

$$Eb' < Ea' - 1 \text{ GPa.} \quad (4)$$

<10> A method for producing a multilayer film, the method comprising: a stretching step of stretching a layer 1 composed of a thermoplastic resin to form an A layer; and a step of forming a B layer with a material Y on a surface of the A layer, the material Y containing as a main component a polymer having a glass transition temperature of −50 to 40° C., a thickness Ta of the A layer, a thickness Tb of the B layer, a planar orientation coefficient P of the A layer, a loss modulus $Ea''$ of the A layer, and a loss modulus $Eb''$ of the B layer satisfying following formulae (1) to (4):

$$2.5 \times 10^{-3} < Tb/Ta < 1.0 \times 10^{-1} \quad (1)$$

$$P > 1.0 \times 10^{-3} \quad (2)$$

$$Eb'' > Ea'' + 0.01 \text{ GPa} \quad (3)$$

$$Eb' < Ea' - 1 \text{ GPa.} \quad (4)$$

Advantageous Effects of Invention

The multilayer film according to the present invention and the method for producing the multilayer film can realize sufficient adhesiveness over the entire surface and efficient production. The polarization plate and the liquid crystal display device according to the present invention can also exhibit the same effect.

DESCRIPTION OF EMBODIMENTS

The present invention will be fully described by way of embodiments and examples, although the present invention is not limited to the following embodiments and examples, and any modification may be made to implement the present invention without departing from the scope of the claims and the equivalents thereto.

In the following description, the words "multilayer film", "phase-difference film", and "polarization plate" refer not only to rigid members, but also to flexible members such as resin film (including sheet).

Unless otherwise specified, the value of in-plane retardation of a film or a layer is a value represented by $(nx-ny) \times d$. Unless otherwise specified, the value of the thickness direction retardation of a film or a layer is a value represented by $[(nx+ny)/2-nz] \times d$. nx herein represents a refractive index in a direction perpendicular to the thickness direction (in-plane direction) of the film or the layer in which the maximum refractive index is given. ny herein represents a refractive index in a direction that is an in-plane direction of the film or the layer perpendicular to the direction of nx. nz herein represents a refractive index in the thickness direction of the film or the layer. d herein represents the thickness of the film or the layer. The aforementioned retardation may be measured by using a commercially available birefringence analyzer (e.g., "KOBRA-21ADH" manufactured by Oji Scientific Instruments, and "WPA-micro" manufactured by Photonic Lattice, Inc.) or by using the Senarmont method.

That directions of constituent elements are "parallel", "perpendicular" and "orthogonal" may include instances having deviations within a range that does not impair the effects of the present invention, such as deviation in a range of ±5°.

<1. Multilayer Film>

The multilayer film according to the present invention includes an A layer composed of a thermoplastic resin and a B layer formed on at least one of the surfaces of the A layer.

<1.1. A Layer>

The A layer is a layer composed of a thermoplastic resin. Examples of the thermoplastic resin may include olefin resins such as polyethylene and polypropylene; polyester resins such as polyethylene terephthalate and polybutylene terephthalate; polyarylene sulfide resins such as polyphenylene sulfide; polyvinyl alcohol resins, polycarbonate resins, polyarylate resins, cellulose ester resins, polyether sulfone resins, polysulfone resins, polyarylsulfone resins, polyvinyl chloride resins, resins containing a polymer having an alicyclic structure, rod-like liquid crystal polymers, polystyrene resins containing homopolymers of styrene or a derivative of styrene or containing copolymers with comonomers thereof; polyacrylonitrile resins, polymethyl methacrylate resins, and multi-component copolymers thereof.

Preferable examples of comonomers contained in the polystyrene resins may include acrylonitrile, maleic anhydride, methyl methacrylate, and butadiene. One type of these resins may be solely used, and two or more types thereof may be used in combination. As the thermoplastic resin used in the present invention, a polymer having an alicyclic structure is preferable in terms of ability to express phase difference, stretchability at low temperature, and adhesiveness to other layers.

A polymer having an alicyclic structure is a polymer whose structural unit has an alicyclic structure. The polymer having an alicyclic structure may have the alicyclic structure in the main chain of the polymer, and may also have in the side chain. As the polymer containing an alicyclic structure, one type thereof may be solely used, and two or more types thereof may be used in combination at any ratio. Among these polymers, the polymer having an alicyclic structure in the main chain is preferable in terms of mechanical strength and heat resistance.

Examples of the alicyclic structures may include saturated alicyclic hydrocarbon (cycloalkane) structures and unsaturated alicyclic hydrocarbon (cycloalkene, and cycloalkyne) structures. Among these structures, the cycloalkane structure and the cycloalkene structure are preferable in terms of, e.g., mechanical strength and heat resistance. In particular, the cycloalkane structure is more preferable.

The number of carbon atoms constituting the alicyclic structure is preferably 4 or more and more preferably 5 or more, and is preferably 30 or less, more preferably 20 or less, and particularly preferably 15 or less, per one alicyclic structure. When the alicyclic structure contains the number of carbon atoms within such a range, the resin containing a polymer having the alicyclic structure exhibit well-balanced properties of mechanical strength, heat resistance, and formability, which is preferable.

In a polymer that has an alicyclic structure, the content of the structural unit having the alicyclic structure may be appropriately adjusted in accordance with the intended use, and is preferably 55% by weight or more, more preferably 70% by weight or more, and particularly preferably 90% by weight or more. When the content of the structural unit having an alicyclic structure in a polymer having the alicyclic structure is within such a range, resins that contain the polymer having the alicyclic structure exhibit good transparency and heat resistance.

Among the polymers having an alicyclic structure, cycloolefin polymers are preferable. The cycloolefin polymer is a polymer having a structure that is obtained by polymerization of a cycloolefin monomer. The cycloolefin monomer is a compound having a ring structure made of carbon atoms, and having a polymeric carbon-carbon double bond in the ring structure. Examples of the polymeric carbon-carbon double bond may include a polymerizable carbon-carbon double bond that is capable of reacting in ring-opening polymerization. Examples of the ring structure of the cycloolefin monomers may include monocyclic, polycyclic, fused polycyclic, and bridged cyclic ring structures, and polycyclic ring structures that are combinations of these structures. Among these ring structures, the polycyclic structure is preferable for achieving well-balanced properties of, e.g., dielectric property and heat resistance of the resulting polymer.

Preferable examples of the cycloolefin polymers may include norbornene polymers, monocyclic olefin polymers, cyclic conjugated diene polymers, and hydrides thereof. Among these polymers, norbornene polymers are particularly preferable because they have good formability.

Examples of the norbornene polymers may include a ring-opening polymer of a monomer having a norbornene structure, a ring-opening copolymer of a monomer having a norbornene structure and a comonomer, and hydrides thereof; an addition polymer of a monomer having a norbornene structure, an addition copolymer of a monomer having a norbornene structure and a comonomer, and hydrides thereof. Among those listed herein, a hydride of the ring-opening (co)polymer of monomers having a norbornene structure is particularly preferable from the viewpoint of, e.g., formability, heat tolerance, low hygroscopicity, size stability, and lightness. The term "(co)polymer" herein refers to the polymer as well as the copolymer.

Examples of the monomers having a norbornene structure may include bicyclo[2.2.1]hept-2-ene (common name: norbornene), tricyclo[4.3.0.1$^{2,5}$]deca-3,7-diene (common name: dicyclopentadiene), 7,8-benzotricyclo[4.3.0.1$^{2,5}$] deca-3-ene (common name: methano-tetrahydrofluorene), tetracyclo[4.4.0.1$^{2,5}$.1$^{7,10}$]dodeca-3-ene (common name: tetracyclododecene), and derivatives of these components (e.g., those with a substituent in the ring). Examples of the substituent may include an alkyl group, an alkylene group, and a polar group. A plurality of the same or different substituents may be bound to the ring. As the monomer having a norbornene structure, one type thereof may be solely used, and two or more types thereof may be used in combination at any ratio.

Exemplary types of the polar group may include a heteroatom, and a group of atoms including a heteroatom. Examples of the heteroatom may include an oxygen atom, a nitrogen atom, a sulfur atom, a silicon atom, and a halogen atom. Specific examples of the polar group may include carboxy group, carbonyloxycarbonyl group, epoxy group, hydroxy group, oxy group, ester group, silanol group, silyl group, amino group, nitrile group, and sulfonic acid group.

Examples of the comonomer capable of undergoing ring-opening copolymerization with the monomer having a norbornene structure may include a monocyclic olefin such as cyclohexene, cycloheptene, and cyclooctene and their derivatives; a cyclic conjugated diene such as cyclohexadiene and cycloheptadiene, and their derivatives. As the comonomer capable of undergoing ring-opening copolymerization with the monomer having a norbornene structure, one type thereof may be solely used, and two or more types thereof may be used in combination at any ratio.

The ring-opening polymer of the monomer having a norbornene structure, and the ring-opening copolymer of the monomer having a norbornene structure and the comonomer that are capable of undergoing copolymerization may be produced by polymerizing or copolymerizing the monomers in the presence of a publicly known ring-opening polymerization catalyst.

Examples of the comonomer capable of undergoing addition copolymerization with the monomer having a norbornene structure may include an α-olefin having 2 to 20 carbon atoms such as ethylene, propylene, and 1-butene, and their derivatives; a cycloolefin such as cyclobutene, cyclopentene, and cyclohexene, and their derivative; an unconjugated diene such as 1,4-hexadiene, 4-methyl-1,4-hexadiene, and 5-methyl-1,4-hexadiene. Among those listed herein, the α-olefin is preferable, and ethylene is more preferable. As the comonomer capable of undergoing addition copolymerization with the monomer having a norbornene structure, one type thereof may be solely used, and two or more types thereof may be used in combination at any ratio.

The addition polymer of the monomer having a norbornene structure, and the addition copolymer of the monomer having a norbornene structure and the comonomer capable of undergoing copolymerization may be produced by polymerizing or copolymerizing the monomers in the presence of a publicly known addition polymerization catalyst.

The hydrogenated product of the ring-opening polymer of the norbornene structure-containing monomer, the hydrogenated product of the ring-opening copolymer of the norbornene structure-containing monomer and the comonomer that is ring-opening copolymerizable with the norbornene structure-containing monomer, the hydrogenated product of the addition polymer of the norbornene structure-containing monomer, and the hydrogenated product of the addition polymer of the norbornene structure-containing monomer and the comonomer that is copolymerizable with the norbornene structure-containing monomer may be produced by, e.g., hydrogenating these polymers in a solution thereof in the presence of a known hydrogenation catalyst that contains a transition metal such as nickel or palladium so as to effect 90% or more of hydrogenation of unsaturated carbon-carbon bonds.

Among the norbornene polymers, preferable are those containing structural units of X:

bicyclo[3.3.0]octane-2,4-diyl-ethylene structure and Y: tricyclo[4.3.0.1$^{2,5}$]decane-7,9-diyl-ethylene structure, where the content of those structural units is 90% by weight or more with respect to all of the structural units contained in the norbornene polymer and the ratio of the X content to the Y content by weight is 100:0 to 40:60. By using such a polymer, it is possible to obtain a resin layer containing such a norbornene-based polymer as a layer that does not cause size change over a long period of time and has a superior stability of optical properties.

Examples of the monocyclic olefin polymers may include an addition polymer of a monocyclic olefin monomer such as cyclohexane, cycloheptene, and cyclooctene.

Examples of the cyclic conjugated diene polymers may include a polymer obtained by a cyclization reaction of an addition polymer of a conjugated diene monomer such as 1,3-butadiene, isoprene, and chloroprene; a 1,2- or 1,4-addition polymer of a cyclic conjugated diene monomer such as cyclopentadiene and cyclohexadiene; and hydrogenated products thereof.

The weight average molecular weight (Mw) of the polymer having an alicyclic structure may be appropriately selected in accordance with the intended use of the multilayer film, and is preferably 10,000 or more, more preferably 15,000 or more, and particularly preferably 20,000 or more, and is preferably 100,000 or less, more preferably 80,000 or less, and particularly preferably 50,000 or less. When the weight average molecular weight is within such a range, the multilayer film exhibits well-balanced properties of mechanical strength and formability, and thus preferable. The weight average molecular weight is measured by gel permeation chromatography using cyclohexane as a solvent (when the test sample does not dissolve in cyclohexane, toluene may be used) in terms of polyisoprene or polystyrene.

The molecular weight distribution (weight average molecular weight (Mw)/number average molecular weight (Mn)) of the polymer having an alicyclic structure is preferably 1.2 or more, more preferably 1.5 or more, and particularly preferably 1.8 or more and is preferably 3.5 or less, more preferably 3.0 or less, and particularly preferably 2.7 or less. When the molecular weight distribution is equal to or higher than the lower limit of the aforementioned range, productivity of the polymer can be increased and production cost can be reduced. When the molecular weight distribution is equal to or lower than the upper limit thereof, the amount of low-molecular weight components is reduced, which can prevent relaxation under the exposure to high temperature and improve stability of the multilayer film.

The saturated water absorption rate of the polymer having an alicyclic structure is preferably 0.03% by weight or less, more preferably 0.02% by weight or less, and particularly preferably 0.01% by weight or less. When the saturated water absorption rate is smaller than the aforementioned value, changes with the lapse of time in the in-plane phase difference Re and the retardation Rth in the thickness direction of the A layer can be reduced. Moreover, degradation of the polarization plate and the liquid crystal display device including the multilayer film according to the present invention can be suppressed, and quality of the display screen can stably be kept in a good state for a long period of time.

The saturated water absorption rate is a percentage value that represents an increase in weight of a test piece after immersion in water at a certain temperature for a certain period of time with respect to the weight of the test piece before immersion. Usually, the weight of the test piece is measured after immersion in water at 23° C. for 24 hours. The saturated water absorption rate of the polymer having an alicyclic structure may be adjusted in the aforementioned range by, e.g., reducing the amount of polar groups in the polymer having an alicyclic structure. To further reduce the saturated water absorption rate, it is preferable that the polymer having an alicyclic structure has no polar group.

The thermoplastic resin may include an optional component as long as such a component does not significantly impair effects of the present invention. Examples of such optional components may include additives such as coloring agents such as pigments and dyes; a plasticizer; a fluorescent brightening agent; a dispersant; a thermostabilizer; a light stabilizer; an ultraviolet absorber; an antistatic agent; an antioxidant; fine particles; and a surfactant. One type thereof may be solely used, and two or more types thereof may be used in combination at any ratio. The content of the polymer constituting the thermoplastic resin is usually 50 to 100% by weight or 70 to 100% by weight.

The glass transition temperature of the thermoplastic resin is preferably 100° C. or higher, more preferably 110° C. or higher, and particularly preferably 120° C. or higher and is preferably 190° C. or lower, more preferably 180° C. or lower, and particularly preferably 170° C. or lower. When the glass transition temperature of the thermoplastic resin is equal to or higher than the lower limit of the aforementioned range, the multilayer film can exhibit a higher durability in high temperature environment. When the glass transition temperature is equal to or lower than the upper limit thereof, stretching treatment can be facilitated.

The absolute value of the photoelastic coefficient of the thermoplastic resin constituting the A layer is preferably $10\times10^{-12}$ Pa$^{-1}$ or smaller, more preferably $7\times10^{-12}$ Pa$^{-1}$ or smaller, and particularly preferably $4\times10^{-12}$ Pa$^{-1}$ or smaller. When the coefficient value is within such a range, fluctuation in the in-plane retardation of the multilayer film can be reduced. The photoelastic coefficient C is a value represented by $C=\Delta n/\sigma$, where $\Delta n$ is birefringence and $\sigma$ is stress.

In the present invention, that the A layer is "composed of" a thermoplastic resin means that the A layer is produced by using the thermoplastic resin. In the production of the A layer, the thermoplastic resin as it is forms the A layer. Alternatively, if necessary, the thermoplastic resin forms the A layer after, e.g., a polymeric reaction or volatilization of solvent in the resin. The method for producing the A layer by using the thermoplastic resin is not limited to any particular method. The A layer may be produced by, e.g., melt molding or solution casting, by which the thermoplastic resin is formed into a film. Examples of the melt molding may include extrusion molding by which melt resin is extruded and molded, press molding, inflation molding, injection molding, blow molding, and stretching molding. Among these methods, extrusion molding, inflation molding, and press molding are preferable in that these methods can produce an A layer having a smooth surface with excellent mechanical strength. Of these methods, extrusion molding is particularly preferable, because thereby the amount of residual solvent can be reduced and the A layer can be produced easily and efficiently.

The A layer is a layer having a certain planar orientation coefficient P. Therefore, the A layer expressing retardation of a certain value. Therefore, it is preferable that the A layer is a layer that has been subjected to stretching treatment for expressing such retardation. The stretching method and the conditions thereof may be the same as those in the stretching step of stretching the multilayer film, which will be described later.

The total light transmittance of the A layer converted to a value of 1 mm thickness is preferably 80% or more and more preferably 90% or more. The haze of the A layer of 1 mm thickness is preferably 0.3% or less and more preferably 0.2% or less. When the haze exceeds the aforementioned value, transparency of the multilayer film may degrade.

The content of the residual volatile components in the A layer is preferably 0.1% by weight or less, more preferably 0.05% by weight or less, and particularly preferably 0.02% by weight or less. When the content of the volatile components is equal to or lower than the aforementioned value, the multilayer film can exhibit improved size stability and reduced change with the lapse of time in the in-plane phase difference Re and the phase difference Rth in the thickness direction of the A layer. Moreover, degradation of the polarization plate and the liquid crystal display device that include the multilayer film according to the present invention can be suppressed, and quality of the display screen can stably be kept in a good state for a long period of time. The volatile components are components having a molecular weight of 200 or smaller, and may include, e.g., residual monomers and solvent. The content of the volatile components may be measured by gas chromatography analysis as a sum of the content of the substances having a molecular weight of 200 or smaller.

<1.2. B Layer>

The B layer is a layer composed of a material Y that contains a polymer Y1 as a main component.

In the present invention, that the B layer is "composed of" a material Y means that the B layer is a layer formed by a layer-forming step using the material Y as a material. In the layer-forming step, the material Y as it is forms the B layer. Alternatively, if necessary, the material Y forms the B layer after, e.g., a polymeric reaction or volatilization of solvent in the material. For example, the material Y is a solution or a dispersion containing the polymer Y1, a cross-linking agent, and a volatile medium such as water, and, after volatilization of the medium and the crosslinking reaction of the polymer Y1 with the crosslinking agent, the B layer is formed.

The B layer is usually in direct contact with the A layer. That is, usually, no other layers are interposed between the A layer and the B layer. However, any optional layer may be interposed between the A layer and the B layer as long as such an optional layer does not significantly impair the effects of the present invention.

The polymer Y1 contained in the material Y is a polymer having a glass transition temperature of −50 to 40° C. It is preferable that the polymer Y1 differs from the polymer of the thermoplastic resin that constitutes the A layer. The polymer Y1 is preferably a water-soluble or a water-dispersible polymer, and is more preferably a polymer that is crosslinkable by a crosslinking agent.

Preferable examples of the polymer Y1 may include acrylic polymers, vinyl polymers, polyurethanes, polyesters, or any other polymers having a functional group introduced thereinto. Examples of the functional group may include polar groups such as carboxyl group, carbonyloxycarbonyl group, epoxy group, hydroxy group, oxy group, ester group, silanol group, silyl group, amino group, nitrile group, and a sulfo group. Among these groups, the functional group is preferably one of methylol group, hydroxy group, carboxyl group, and amino group, more preferably hydroxy group or carboxyl group, and particularly preferably hydroxy group. The content of the polar group in the polymer Y1 is preferably 0.0001 to 1 equivalent/kg, and particularly preferably 0.001 to 1 equivalent/kg.

Examples of the acrylic polymers may include a homopolymer of a monomer that is any one of acrylic acid, acrylic acid esters such as alkyl acrylate, acrylamide, acrylonitrile, methacrylic acid, methacrylic acid esters such as alkyl methacrylate, methacrylamide, and methacrylonitrile; a copolymer obtained by polymerization of two or more types of these monomers, and a copolymer obtained by polymerization of one or more types of the aforementioned monomers with a comonomer. Among these acrylic polymers, homopolymers of a monomer selected from acrylic acid esters such as alkyl acrylate and methacrylic acid esters such as alkyl methacrylate, or copolymers obtained by polymerization of two or more types of the monomers are preferable. Examples of the preferable acrylic polymers may include homopolymers of a monomer selected from acrylic acid esters and methacrylic acid esters that contain an alkyl group having 1 to 6 carbon atoms, and copolymers obtained by polymerization of two or more types of the monomers. The acrylic polymer is a polymer having the aforementioned composition as the main component, and is obtained by using, in part, a monomer that includes the aforementioned functional group so that the acrylic polymer can be subjected to a reaction with a functional group of the crosslinking agent (crosslinking reaction).

Examples of the vinyl polymers may include polyvinyl alcohol, acid-modified polyvinyl alcohol, polyvinyl formal, polyvinyl butyral, polyvinyl methyl ether, polyolefin, ethylene-butadiene copolymer, polyvinyl acetate, vinyl chloride-vinyl acetate copolymer, vinyl chloride-(meth)acrylic acid ester copolymer, and ethylene-vinyl acetate copolymers (preferably, ethylene-vinyl acetate-(meth)acrylic acid ester copolymer). Among these polymers, polyvinyl alcohol, acid-modified polyvinyl alcohol, polyvinyl formal, polyolefin, ethylene-butadiene copolymer, and ethylene-vinyl acetate copolymers (preferably, ethylene-vinyl acetate-acrylic acid ester copolymer) are preferable. When the vinyl polymer is polyvinyl alcohol, acid-modified polyvinyl alcohol, polyvinyl formal, polyvinyl butyral, polyvinyl methyl ether, or polyvinyl acetate, the vinyl polymer is prepared as a polymer having a hydroxy group by, e.g., keeping a vinyl alcohol unit remaining in the polymer, so that they can crosslink with a crosslinking agent (such as a carbodiimide compound). When the vinyl polymer is any one of other polymers, the vinyl polymer is prepared as a crosslinkable polymer by, e.g., using as a part of monomers a monomer having a methylol group, a hydroxy group, a carboxyl group, and/or an amino group, so that they can crosslink with the crosslinking agent.

Examples of the polyurethanes may include polyurethanes introduced from any one of or a mixture of any of the following with a polyisocyanate: aliphatic polyester polyols obtained by a reaction between a polyol compound (for example, ethylene glycol, propylene glycol, 1,4-butanediol, neopentyl glycol, glycerin, and trimethylol propane) with a polybasic acid (such as a polybasic carboxylic acid (for example, a polybasic carboxylic acid such as a dicarboxylic acid such as adipic acid, succinic acid, sebacic acid, glutaric acid, maleic acid, fumaric acid, phthalic acid, isophthalic acid, and terephthalic acid, and a tricarboxylic acid such as trimellitic acid and anhydrides thereof)); polyether polyols (such as poly(oxypropylene ether) polyol and poly(oxyethylene-propylene ether) polyol); polycarbonate polyols; and polyethylene terephthalate polyols. The polyurethane can use a hydroxy group that remains unreacted after the reaction of the polyol and the polyisocyanate, as a polar group that can crosslink with the functional group in the crosslinking agent. As the polyurethane, a polycarbonate polyurethane that has a carbonate structure in its skeleton structure is preferable.

As the polyurethane, a polyurethane contained in an aqueous emulsion that is commercially available as a water-based urethane resin may be used. The water-based urethane resin is a composition containing a polyurethane and water, and usually contain the polyurethane and an optional component contained as necessary in water in a dispersed state. Examples of the water-based urethane resins may include "Adeka Bontighter" series manufactured by ADEKA Co., Ltd., "Olester" series manufactured by Mitsui Chemicals, Inc., "Bondic" series and "Hydran (such as WLS201 and WLS202)" series manufactured by DIC Corporation, "Impranil" series manufactured by Bayer MaterialScience AG., "Poiz" series manufactured by Kao corporation, "Sanprene" series manufactured by Sanyo Chemical Industries, Ltd., "Super Flex" series manufactured by DKS Co., Ltd., "NeoRez" series manufactured by Kusumoto Chemicals, Ltd., and "Sancure" series manufactured by Lubrizol Corporation. As the polyurethane, one type thereof may be solely used, and two or more types thereof may be used in combination at any ratio.

As the polyester, polymers that are obtained by a reaction of the polyol compound and the polybasic acid may be generally used. Polyester can use, e.g., a hydroxy group or a carboxyl group that remains unreacted after the reaction between the polyol and the polybasic acid, as a functional group (polar group) with which the polyesters can crosslink with the crosslinking agent. A third component having a polar group such as a hydroxy group or a carboxyl group may be added to the reaction system in the polymerization. To increase the adhesiveness, the polyester may be combined with an acrylic polymer, and the combined polymer may be used as the polymer Y1. Examples of the acrylic polymer may include a homopolymer of a monomer that is any one of acrylic acid, acrylic acid esters such as alkyl acrylate, acrylamide, acrylonitrile, methacrylic acid, methacrylic acid esters such as alkyl methacrylate, methacrylamide, and methacrylonitrile; a copolymer obtained by polymerization of two or more types of these monomers, and a copolymer obtained by polymerization of one or more types of the aforementioned monomers with a comonomer.

As the water-soluble or water-dispersed polyester, appropriately synthesized product may be used. Alternatively, a commercially available product may also be used. Examples of the commercially available products may include "Nichigo Polyester (such as Nichigo Polyester W-0030, Nichigo Polyester W-0005530WO, and Nichigo Polyester WR-961)" series (manufactured by Nippon Synthesis Chemical Industry Co., Ltd.) and "Pes-resin A (such as Pes-resin A-210, Pes-resin A-520, Pes-resin A-684G, and Pes-resin A-695GE)" series (manufactured by Takamatsu Oil & Fat Co., Ltd.).

The material Y may include an organic solvent, but the material Y is preferably an aqueous emulsion that does not substantially include any organic solvents. Specifically, the content of such an organic solvent may be less than 1% by weight. Examples of the organic solvent may include methyl ethyl ketone, N-methyl-2-pyrrolidone, and butyl cellosolve.

The material Y that constitutes the B layer preferably contains a crosslinking agent in addition to the polymer Y1. The crosslinking agent is not limited to any particular type, but may be a compound having two or more functional groups in a molecule that can react with the functional group (polar group) in the polymer Y1 to form a bond. Examples of the crosslinking agent may include epoxy compounds, carbodiimide compounds, oxazoline compounds, and isocyanate compounds.

<Epoxy Compounds>

As the epoxy compound, a multifunctional epoxy compound having two or more epoxy groups in a molecule may be used. With the multifunctional epoxy compound, crosslinking reaction can be promoted and mechanical strength of the B layer can be effectively improved.

As the epoxy compound, a water-soluble compound or a compound that is emulsifiable in a dispersed state in water is preferable. Such an epoxy compound may be preferably used in a water-based resin composition. The water-based resin composition is a composition that includes the solid content in a dissolved or dispersed state in a water-based solvent such as water. When the epoxy group has water-solubility or water-emulsifiability, the water-based resin composition can obtain good application property, and the production of the B layer can thereby be facilitated.

Examples of the epoxy compound may include a diepoxy compound obtained by etherifying 1 mole of a glycol such as ethylene glycol, diethylene glycol, triethylene glycol, polyethylene glycol, propylene glycol, dipropylene glycol, 1,4-butanediol, 1,6-hexaneglycol, and neopentyl glycol with 2 moles of epichlorohydrin; a polyepoxy compound obtained by etherifying 1 mole of a polyhydric alcohol such as glycerin, polyglycerin, trimethylolpropane, pentaerythritol, and sorbitol with 2 or more moles of epichlorohydrin; and a diepoxy compound obtained by esterifying 1 mole of a dicarboxylic acid such as phthalic acid, terephthalic acid, oxalic acid, and adipic acid with 2 moles of epichlorohydrin. As the epoxy compound, one type thereof may be solely used, and two or more types thereof may be used in combination at any ratio.

More specifically, preferable examples of the epoxy compound may include 1,4-Bis(2',3'-epoxypropyloxy)butane, 1,3,5-triglycidyl isocyanurate, 1,3-diglycidyl-5-(γ-acetoxy-β-oxypropyl)isocyanurate, sorbitol polyglycidyl ethers, polyglycerol polyglycidyl ethers, pentaerythritol polyglycidyl ethers, diglycerol polyglycidyl ether, 1,3,5-triglycidyl (2-hydroxyethyl)isocyanurate, glycerol polyglycerol ethers. and trimethylol propane polyglycidyl ethers. Examples of commercially available products of such compounds may include "Denacol" series such as Denacol EX-521 and EX-614B manufactured by Nagase ChemteX Co., Ltd.

The amount of the epoxy compound with respect to 100 parts by weight of the polymer Y1 is usually 2 parts by weight or more, preferably 4 parts by weight or more, and more preferably 5 parts by weight or more and is usually 35 parts by weight or less, preferably 30 parts by weight or less, and more preferably 25 parts by weight or less. When the amount of the epoxy compound is equal to or higher than the lower limit of the aforementioned range, the reaction between the epoxy compound and the polymer Y that constitutes the B layer proceeds to a sufficient level, thereby appropriately improving the mechanical strength of the B layer. When the amount of the epoxy compound is equal to or lower than the upper limit thereof, the residual amount of unreacted epoxy compounds can be reduced, thereby appropriately improving the mechanical strength of the B layer.

When a polymer having a functional group is used as the polymer Y1, the amount of the epoxy compound is preferably 0.2 time or more, more preferably 0.4 time or more, and particularly preferably 0.6 time or more and is preferably 5 times or less, more preferably 4.5 times or less, and particularly preferably 4 times or less larger on weight basis with respect to the amount of the epoxy compound equivalent to the functional group. The amount of the epoxy compound equivalent to the functional group is a theoretical amount of the epoxy compound capable of reacting with the total amount of the functional group of the polymer Y1 without excessiveness nor insufficiency. The functional group of the polymer Y1 may react with the epoxy group of the epoxy compound. When the amount of the epoxy compound is within the aforementioned range, the reaction of the functional group and the epoxy compound can proceed to an appropriate level, and mechanical strength of the B layer can thereby effectively improved.

<Carbodiimide Compounds>

As the carbodiimide compound, a compound having two or more carbodiimide groups in a molecule may be used. The carbodiimide compound is usually synthesized by a condensation reaction of an organic diisocyanate. The organic group of the organic diisocyanate used in the synthesis of the compound having two or more carbodiimide groups in a molecule is not limited to any particular type, and may be an aromatic group or an aliphatic group, or a mixed group thereof. From the viewpoint of reactivity, the aliphatic group is preferable.

Examples of the material used in the synthesis may include organic isocyanates, organic diisocyanates, and organic triisocianates. Examples of the organic isocyanates may include aromatic isocyanates, aliphatic isocyanates, and the mixtures thereof. Specifically, examples of the organic isocyanates may include 4,4'-diphenylmethane diisocyanate, 4,4-diphenyldimethylmethane diisocyanate, 1,4-phenylene diisocyanate, 2,4-tolylene diisocyanate, 2,6-tolylene diisocyanate, hexamethylene diisocyanate, cyclohexane diisocyanate, xylylene diisocyanate, 2,2,4-trimethylhexamethylene diisocyanate, 4,4'-dicyclohexylmethane diisocyanate, and 1,3-phenylene diisocyanate. Examples of organic monoisocyanates may include isophorone isocyanate, phenyl isocyanate, cyclohexyl isocyanate, butyl isocyanate, and naphthyl isothiocyanate.

As the carbodiimide compound, e.g., "Carbodilite" series (such as Carbodilite V-02, V-02-L2, SV-02, V-04, E-02) manufactured by Nisshinbo Chemical Inc. are available as commercial products. The carbodiimide compound may be added to the polymer Y1 of the B layer at an amount in a range of 1 to 200% by weight and more preferably 5 to 100% by weight.

<Oxazoline Compounds>

As the oxazoline compound, a polymer including an oxazoline group represented by the following formula (I) may be used, where $R^4$, $R^5$, $R^6$, and $R^7$ are the same or different from each other, and represent a hydrogen atom, a halogen atom, an alkyl group, an aralkyl group, a phenyl group, or a substituted phenyl group. Examples of the oxazoline compound may include addition polymerizable oxazolines. Such oxazolines may be obtained by polymerization of a monomer component that may additionally include an optional unsaturated monomer as necessary, by a conventionally known solution polymerization method in an aqueous medium.

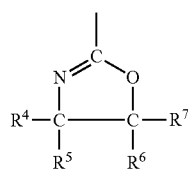

(I)

Examples of the addition polymerizable oxazolines may include a compound represented by the following formula (II), where $R^4$, $R^5$, $R^6$, and $R^7$ are the same as those in formula (I), and $R^8$ represents an acyclic organic group having an addition-polymerizable unsaturated bond. Specific examples of such compounds may include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline, and one of them or two or more of them may be used. Among these compounds, 2-isopropenyl-2-oxazoline is preferable from the viewpoint of industrial availability.

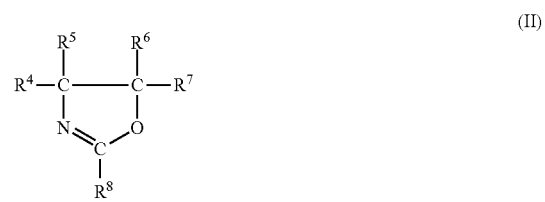

(II)

The amount of the addition polymerizable oxazoline compound to be used is not limited to any particular amount, and is preferably 5% by weight or more, and preferably 50% by weight or less with respect to 100% by weight of the total monomer components used in the production of the oxazoline compound. When the amount is less than 5% by weight, curing may be insufficient, and durability and water-resistant property may degrade. The optional unsaturated monomer is not particularly limited, and may be a monomer that is capable of being copolymerized with the addition polymeriziable oxazoline and that does not react with the oxazoline group. One of the aforementioned monomers or two or more of the aforementioned monomers may be used.

Examples of the oxazoline compound may include water-soluble type compounds such as Epocros WS-500 and WS-700 and emulsion type compounds such as Epocros K-2010, K-2020, and K-2030 (manufactured by Nippon Shokubai Co., Ltd.). In particular, water-soluble type compounds having high reactivity with the main compound are preferable.

The amount of the oxazoline compound used is preferably set such that the molar ratio of the functional group such as a carboxyl group included in the reactant with respect to the oxazoline group included in the oxazoline compound (the number of moles of functional group/the number of moles of the oxazoline group) ranges from 100/100 to 100/20. When the molar ratio of the functional group to the oxazoline group exceeds 100/20, unreacted functional groups may remain, and when the molar ratio is less than 100/100, excessive oxazoline groups may be produced and hydrophilic groups may increase. It is also preferable to set the molar ratio within the aforementioned range when other crosslinking agents are used together with the oxazoline compound.

When the polymer Y1 has a carboxyl group and the carboxyl group is neutralized, the reaction of the oxazoline group and the carboxylic acid salt does not smoothly proceed in the reaction between the polymer Y1 and the oxazoline compound. Therefore, the reactivity can be controlled by changing the type (volatility) of the amine used in the neutralization.

<Isocyanate Compounds>

As the isocyanate compound, an aliphatic, alicyclic, or aromatic compound that has two or more isocyanate groups in a molecule may be used. Preferable examples of the aliphatic diisocyanate compounds may include aliphatic diisocyanates having 1 to 12 carbon atoms, such as hexamethylene diisocyanate, 2,2,4-trimethylhexane diisocyanate, and hexane diisocyanate (HDI). Preferable example of the alicyclic diisocyanate compounds may include alicyclic diisocyanate compounds having 4 to 18 carbon atoms, such as 1,4-cyclohexane diisocyanate, methylcyclohexylene diisocyanate, isophorone diisocyanate (IPDI), and dicyclohexylmethane diisocyanate (HMDI). Examples of the aromatic isocyanates may include tolylene diisocyanate (TDI), 4,4'-diphenylmethane diisocyanate, and xylylene diisocyanate.

To the material Y, e.g., a curing accelerator or an auxiliary curing agent may be added in addition to the crosslinking agent. When, e.g., an epoxy compound is used as the crosslinking agent, a curing accelerator such as a tertiary amine-based compound (compounds that contain 2,2,6,6-tetramethylpiperidyl group having a tertiary amine at the 4-position are excluded) and a boron trifluoride complex compound may be suitably used. As the curing accelerator, one type thereof may be solely used, and two or more types thereof may be used in combination at any ratio. The amount of the curing accelerator may be appropriately adjusted in accordance with the intended use, and is usually 0.001 to 30 parts by weight, preferably 0.01 to 20 parts by weight, and more preferably 0.03 to 10 parts by weight with respect to 100 parts by weight of the polymer Y1 having a functional group.

Examples of the auxiliary curing agents may include oxime-nitroso-based auxiliary curing agents such as quinonedioxime, benzoquinonedioxime, and p-nitrosophenol; maleimide-based auxiliary curing agents such as N,N-m-phenylene bismaleimide; allyl-based auxiliary curing agents such as diallyl phthalate, triallyl cyanulate, and triallyl isocyanulate; methacrylate-based auxiliary curing agents such as ethyleneglycol dimethacrylate and trimethylolpropane trimethacrylate; and vinyl-based auxiliary curing agents such as vinyltoluene, ethylvinylbenzene, and divinylbenzene. As these auxiliary curing agents, one type thereof may be solely used, and two or more types thereof may be used in combination at any ratio. The amount of auxiliary curing agent is usually 1 to 100 parts by weight and preferably 10 to 50 parts by weight with respect to 100 parts by weight of the crosslinking agent.

<Other Components>

The material Y may contain other components in addition to the aforementioned components as long as such components do not significantly impair the effects of the present invention. The material Y usually contains water or a water-soluble solvent. Examples of the water-soluble solvent may include methanol, ethanol, isopropyl alcohol, acetone, tetrahydrofuran, N-methyl pyrrolidone, dimethyl sulfoxide, ethylene glycol monomethyl ether, ethylene glycol monobutyl ether, methyl ethyl ketone, and triethylamine. As the solvent, water is preferable. As the solvent, one type thereof may be solely used, and two or more types thereof may be used in combination at any ratio. It is preferable to set the amount of the solvent to be added to the material Y such that the material Y has a viscosity that exhibits good application properties.

The material Y may contain one type or two or more types of fine particles. Accordingly, the B layer contains the fine particles, and an uneven surface can be formed on the B layer. When the multilayer film is a long-length film, such unevenness formed on the B layer reduces the contact area between the B layer and other layers upon winding the multilayer film. Such a smaller contact area can give the B layer a greater slipperiness on its surface, which can prevent wrinkles on the multilayer film that is being wound.

The average diameter of the fine particles is usually 1 nm or larger, preferably 5 nm or larger, and more preferable 10 nm or larger and is usually 500 nm or smaller, preferably 300 nm or smaller, and more preferably 200 nm or smaller. With fine particles having an average diameter equal to or larger than the lower limit of the aforementioned range, slipperiness on the B layer can be effectively increased. With fine particles having an average diameter equal to or smaller than the upper limit thereof, haze can be kept at a low level. The average diameter of the particles is a diameter corresponding to 50% cumulative volume calculated from the smallest diameter of a particle size distribution (50% average volume diameter D50) measured by a laser diffraction method.

Although the fine particles may be either inorganic or organic, the fine particles are preferably water-dispersible fine particles. Examples of the materials of the inorganic fine particles may include inorganic oxides such as silica, titania, alumina, and zirconia; calcium carbonate, talc, clay, calcined kaolin, calcined calcium silicate, hydrated calcium silicate, aluminum silicate, magnesium silicate, and calcium phosphate. Examples of the materials of the organic fine particles may include silicone resins, fluorine resins, and acrylic resins. Among these materials, silica is preferable. Silica fine particles are advantageous in that they can prevent wrinkles on the film, are less prone to cause haze, are transparent, and have no color. Accordingly, the impact on optical properties of the multilayer film according to the present invention is kept at a low level. Silica fine particles are also advantageous in that silica has a good dispersibility and dispersion stability in urethane resins. Among the types of silica fine particles, amorphous colloidal silica particles are particularly preferable.

The amount of fine particles contained in the material Y with respect to 100 parts by weight of the polymer Y1 is usually 0.5 part by weight or more, preferably 5 parts by weight or more, more preferably 8 parts by weight or more and is usually 20 parts by weight or less, preferably 18 parts by weight or less, and more preferably 15 parts by weight or less. When the amount of fine particles is equal to or larger than the lower limit of the aforementioned range, the multilayer film according to the present invention can prevent wrinkles from developing while being wound. When the amount of fine particles is equal to smaller than the upper limit thereof, the multilayer film according to the present invention can prevent opacity in the appearance.

The material Y may also contain other components such as heat-resistant stabilizers, weather resistance agents, leveling agents, surfactants, antioxidants, antistatic agents, slip agents, anti-blocking agents, anti-fog agents, lubricants, dyes, pigments, natural oils, synthetic oils, waxes, and crosslinking agents other than the aforementioned ones. One type thereof may be solely used, and two or more types thereof may be used in combination at any ratio.

The material Y contains the polymer Y1 as a main component. Specifically, the amount of the polymer Y1 in the material Y is 60 to 100% by weight and preferably 70 to 100% by weight based on 100% by weight of the total solid content in the material Y.

The A layer and the B layer that constitute the multilayer film according to the present invention satisfy the following formulae (1) to (4), where Ta represents the thickness of the A layer, Tb represents the thickness of the B layer, P represents the planar orientation coefficient of the A layer, $Ea''$ represents the loss modulus of the A layer, $Eb''$ represents the loss modulus of the B layer, $Ea'$ represents the storage modulus of the A layer, and Eb' represents the storage modulus of the B layer.

$$0.0003 < Tb/Ta < 0.2 \quad (1)$$

$$P > 0.001 \quad (2)$$

$$Eb'' > Ea'' + 0.01 \text{ GPa} \quad (3)$$

$$Eb' < Ea' - 1 \text{ GPa} \quad (4)$$

As indicated by the aforementioned formula (1), the ratio Tb/Ta of the thickness Tb of the B layer to the thickness Ta of the A layer is 0.0003 or more, preferably 0.001 or more, more preferably 0.0025 or more, still more preferably more than 0.0025, and particularly preferably more than 0.01, and is 0.2 or less, preferably 0.15 or less, more preferably 0.1 or less, still more preferably less than 0.1, and far more preferably less than 0.09. When Tb/Ta is equal to or smaller than the lower limit, the B layer exhibits insufficient adhesion strength. When Tb/Ta is equal to or larger than the upper limit, the viscosity of the B layer becomes too large to allow smooth roll-up of the multilayer film when it is a long length film.

The thickness of the A layer is preferably 8 μm or more, more preferably 9 μm or more, and particularly preferably 10 μm or more and is preferably 100 μm or less, more preferably 90 μm or less, and particularly preferably 80 μm or less. When the A layer has a thickness equal to or larger than the lower limit of the aforementioned range, the multilayer film can exhibit an enhanced mechanical strength. When the A layer has a thickness equal to or smaller than the upper limit thereof, thickness of the multilayer film itself can be reduced.

The thickness of the B layer is preferably 50 nm or more, more preferably 100 nm or more, and particularly preferably 150 nm or more and is preferably 5 μm or less, more preferably 2 μm or less, and particularly preferably 1 μm or less. When the B layer has a thickness equal to or smaller than the lower limit, the B layer exhibits insufficient adhesion strength. When the B layer has a thickness equal to or larger than the upper limit, the relatively flexible B layer may deform, which prevents smooth roll-up of the multilayer film when it is a long-length film. That is, when the B layer has a thickness within the aforementioned range, the B layer can exhibit good adhesion strength to the A layer and the thickness of the resulting multilayer film can be reduced.

As indicated by the aforementioned formula (2), the planar orientation coefficient P of the A layer needs to be larger than 0.001, and is preferably larger than 0.0015 and more preferably larger than 0.002. When the planar orientation coefficient P of the A layer is larger than the aforementioned value, thickness of the A layer can be reduced while phase difference can be increased. The upper limit of the planar orientation coefficient P is not limited to any particular value, and it may be smaller than 0.03. The planar orientation coefficient P is a parameter indicating the state of the orientation of the molecular chains contained in a layer, and is calculated from the refractive indices nx, ny, and nz of the layer in accordance with the following expression:

$$P = (nx+ny)/2 - nz$$

The measurement wavelength of the refractive indices may be 590 nm.

In the production of the multilayer film according to the present invention, the planar orientation coefficient P may be adjusted to a desired value by appropriately adjusting the conditions that affect the optical anisotropic property of the A layer. Specifically, in a stretching step of stretching a film composed of the A layer or a film including the A layer, conditions such as stretching temperature, stretching velocity, and stretching ratio may be adjusted for adjusting P to a value larger than 0.001. In a step of applying heat or tension to a film composed of the A layer or a film including the A layer, the heat temperature and the tension applied to the film may also be adjusted for adjusting P to a value larger than 0.001. For example, in a step of forming the B layer on the A layer, heat and tension applied to the film in a operation for drying the material for forming the B layer may be adjusted for adjusting P to a value larger than 0.001.

As indicated by the aforementioned formula (3), the difference (Eb"−Ea") between the loss modulus Ea" of the A layer and the loss modulus Eb" of the B layer needs to be equal to or larger than 0.01 GPa. Preferably, (Eb"−Ea") is larger than 0.01 GPa and preferably larger than 0.015 GPa. That is, Eb">Ea"+0.01 GPa, and preferably Eb">Ea"+0.015 GPa. When the difference between the loss moduli is smaller than 0.01 GPa, the multilayer film exhibits insufficient adhesiveness. The upper limit of (Eb"−Ea") is not limited to any particular value, but may be equal to or smaller than 1 GPa. Eb" is preferably 0.1 GPa or more, more preferably 0.12 GPa or more, still more preferably 0.25 GPa or more, and particularly preferably 0.26 GPa or more and is preferably 1 GPa or less and more preferably 0.9 GPa or less. When Eb" is equal to or smaller than the lower limit, the B layer exhibits insufficient adhesion strength. When Eb" is equal to or larger than the upper limit, the viscosity of the B layer becomes too large to allow smooth roll-up of the multilayer film when it is a long length film.

The difference between the loss modulus Ea" of the A layer and the loss modulus Eb" of the B layer may be adjusted to a desired value by appropriately selecting the material of the A layer and the material of the B layer. Specifically, when a polyurethane having a low glass transition temperature is used as the polymer Y1, a higher loss modulus Eb" can be obtained. Examples of the polyurethanes having a low glass transition temperature may include polyurethanes having flexible, long-chain polyols.

When the multilayer film according to the present invention includes only one A layer, the thickness Ta indicates the thickness of this A layer. When the multilayer film according to the present invention includes two or more A layers, the thickness Ta indicates the total thickness of the A layers. When the multilayer film according to the present invention includes only one B layer, the thickness Tb indicates the thickness of this B layer. When the multilayer film according to the present invention includes two or more B layers, the thickness Tb indicates the total thickness of the B layers.

It is herein preferable that the difference in refractive index at the interface between the A layer and the B layer is 0.06 or less. When the difference in the refractive index is equal to or smaller than the aforementioned value, light can pass through the multilayer film according to the present invention with suppressed amount of optical loss. When the difference in the refractive index is out of the aforementioned range, light is reflected on the interface between the A layer and the B layer, which reduces the transmittance of light and increases haze of the film.

As indicated by the aforementioned formula (4), the difference (Ea'−Eb') between the storage modulus Ea' of the A layer and the storage modulus Eb' of the B layer is equal to or larger than 1 GPa, preferably larger than 1 GPa, and more preferably equal to or larger than 1.2 GPa, and is preferably equal to or smaller than 6 GPa, more preferably equal to or smaller than 4 GPa, and particularly preferably equal to or smaller than 3 GPa. When (Ea'−Eb') is smaller than the aforementioned lower limit, the B layer exhibits insufficient adhesion strength, which is not preferable. When (Ea'−Eb') is a large value, the B layer may be more flexible than the A layer. That can elevate energy for deformation of the B layer, and result in larger peel strength.

<Other Layers>

The multilayer film according to the present invention may include an optional layer on a surface of the A layer that is the opposite surface from the B layer. Examples of the optional layer may include an anti-reflective layer, a hard coat layer, an antistatic layer, an antiglare layer, an anti-fouling layer, and a separator film.

<Method for Producing Multilayer Film>

Subsequently, the method for producing the multilayer film will be described.

The multilayer film may be produced by, e.g., the following steps. That is, the method for producing a multilayer film may include: a step of forming a film (layer 1) composed of a thermoplastic resin that constitutes the A layer; a step of forming on a surface of the film (layer 1) a layer 2 with a material Y, to thereby form a multilayer film substrate; and a stretching step of stretching the multilayer film substrate to form a multilayer film that includes the A layer corresponding to the layer 1 after stretching and a B layer corresponding to the layer 2 after stretching.

In the step of forming the film (layer 1), the film may be produced by molding the thermoplastic resin in a form of a film by, e.g., melt molding or solution casting. Examples of the melt molding may include extrusion molding by which melt resin is extruded and molded, press molding, inflation molding, injection molding, blow molding, and stretching molding. Among these methods, extrusion molding, inflation molding, and press molding are preferable in that these methods can produce a layer 1 having a smooth surface with excellent mechanical strength. Of these methods, extrusion molding is particularly preferable, because thereby the amount of residual solvent can be reduced and the layer 1 can be produced easily and efficiently.

Step of forming a layer 2 with a material Y on a surface of the layer 1 to form a multilayer film substrate may be performed by, e.g., the following procedure. That is, firstly, the material Y is applied onto a surface of the layer 1 to form a coating layer. Then, the resin component in the coating layer is cured to obtain the layer 2.

The method for the application is not limited to any particular method, and any known application methods may be adopted. Specific examples of the application method may include wire-bar coating, dip coating, spray coating, spin coating, roll coating, gravure coating, air-knife coating, curtain coating, slide coating, and extrusion coating.

When the material Y contains a solvent, the solvent is generally removed by drying during curing. The drying may be performed by any method such as vacuum drying or heat drying. Among these methods, performing heat drying to cure the resin in the material Y is preferable from the viewpoint of accelerating reactions such as crosslinking reaction in the material Y. When heat drying is used for curing the resin in the material Y, the heating temperature is appropriately set to a temperature at which the solvent can be dried and the resin components in the material Y can be cured.

As the material Y, it is preferable to use, e.g., an aqueous emulsion (aqueous dispersion). In this case, components of the material Y, i.e. components such as the polymer Y1 and the crosslinking agent, are usually dispersed in the material Y in a form of particles. The diameter of the particles is preferably from 0.01 µm to 0.4 µm from the viewpoint of optical properties of the multilayer film according to the present invention. The diameter of the particles may be measured by the dynamic light scattering method. For example, the particle diameter may be measured by using light scattering photometers such as DLS-8000 series manufactured by Otsuka Electronics Co., Ltd.

When the material Y is an aqueous emulsion, the viscosity thereof is preferably 15 mPa·s or less, and particularly preferably 10 mPa·s or less. When the viscosity is equal to or lower than the aforementioned value, the aqueous emulsion can be uniformly applied onto the surface of the A layer. The lower limit of the viscosity of an urethane composition is not limited to any particular value, but is preferably 1 mPa·s or more. The viscosity is a value measured by a tuning-fork vibration viscometer at 25° C. The viscosity of the aqueous emulsion may be adjusted by changing the content of the solvent in the aqueous emulsion or the diameter of the particles contained in the resin.

In the stretching step, the multilayer film substrate is stretched, by which the multilayer film including the A layer corresponding to the layer 1 after stretching and the B layer corresponding to the layer 2 after stretching may be obtained. Although the stretching treatment may be performed after the curing of the material Y, it is preferable to perform the stretching treatment before or during the curing of the resin component in the material Y to prevent removal of, e.g., fine particles off the layer composed of the material Y. It is further preferable to perform the stretching treatment during the curing of the resin component in the material Y for forming a uniform B layer.

In the stretching step, the layer 1 and the layer 2 are co-stretched, which gives the layer 1 desired phase difference property, and the A layer is formed. That is, stretching of the layer 1 also stretches the layer 2 formed on a surface of the layer 1. Usually, the layer 2 has a far thinner thickness than the layer 1, and thus the B layer corresponding to the layer 2 after stretching does not express a large phase difference.

The stretching method is not limited to any particular method. Examples of the stretching method may include a method in which the film is uniaxially stretched in the length direction by utilizing the difference in peripheral speed between rolls (lengthwise uniaxial stretching); a method in which the film is uniaxially stretched in the width direction using a tenter (crosswise uniaxial stretching); a method in which the uniaxial stretching in the length direction and the uniaxial stretching in the width direction are sequentially performed (sequential biaxial stretching); a method in which the stretching in the length direction and the stretching in the width direction are simultaneously performed (simultaneous biaxial stretching); and a method in which the film is stretched in a diagonal direction with respect to the length direction of the pre-stretch film (diagonal stretching). The "diagonal direction" refers to a direction that is not parallel nor orthogonal.

The film temperature during stretching is preferably equal to or higher than Tg, more preferably equal to or higher than Tg+5° C., and particularly preferably equal to or higher than Tg+8° C. and preferably equal to lower than Tg+35° C., more preferably equal to or lower than Tg+30° C., and particularly preferably equal to or lower than Tg+25° C., based on the glass transition temperature Tg of the thermoplastic resin that forms the A layer. When the film temperature during stretching is equal to or higher than the lower limit of the aforementioned range, expression of a large retardation in the A layer can be prevented. When the film temperature is equal to or lower than the upper limit thereof, the A layer can stably express a desired retardation.

The stretching ratio may be appropriately set in accordance with the retardation that is desired to be expressed by the multilayer film. When, e.g., the lengthwise stretching is performed, the stretching ratio is preferably 1.1 times or more and is preferably 5.0 times or less. When, e.g., the crosswise stretching is performed, the stretching ratio is preferably 1.3 times or more and more preferably 1.5 times or more and is preferably 6.0 times or less and more preferably 5.0 times or less. When the stretching ratio is equal to or larger than the lower limit of the aforementioned range, unevenness in the thickness can prevented. When the stretching ratio is equal to or smaller than the upper limit thereof, operating load on the stretching equipment can be suppressed. The stretching may be performed once, and may also be performed two or more times.

In the method for producing the multilayer film, a step other than the aforementioned steps may be performed. For example, before the stretching treatment, the multilayer film may be subjected to pre-heating treatment. Examples of the measures for heating the multilayer film may include an oven-type heater, a radiation heater, and immersion into a liquid. Among these measures, the oven-type heater is preferable. The heating temperature in the pre-heating treatment is preferably equal to or higher than a temperature of "stretching temperature−40° C." and more preferably equal to or higher than a temperature of "stretching temperature−30° C." and is preferably equal to or lower than a temperature of "stretching temperature+20° C." and more preferably equal to or lower than a temperature of "stretching temperature+15° C.". The stretching temperature referred to herein is the preset temperature of the heater.

For example, the multilayer film after stretching may be subjected to fixing treatment. The heating temperature in the fixing treatment is preferably equal to or higher than room temperature and more preferably equal to or higher than a temperature of "stretching temperature−40° C." and is preferably equal to or lower than a temperature of "stretching temperature+30° C." and more preferably equal to or lower than a temperature of "stretching temperature+20° C.".

Surface modification treatment to a surface of the layer 1 may be performed before forming the layer 2 on the layer 1 to improve adhesiveness of the layer 1 to the layer 2. Examples of the surface modification treatment may include energy ray irradiation treatment and chemical treatment. Examples of the energy ray irradiation treatment may include corona discharge treatment, plasma treatment, electron beam irradiation treatment, and ultraviolet irradiation treatment. Among these treatments, corona discharge treatment and plasma treatment are preferable, and corona discharge treatment is particularly preferable from the viewpoint of, e.g., treatment efficiency. Examples of the chemical treatment may include saponification treatment and immersion and washing treatment in which the film is immersed in an oxidizing agent aqueous solution such as a potassium bichromate solution or a concentrated sulfuric acid, and then washed with water.

It is preferable to perform surface hydrophilization treatment on a surface of the B layer (the layer 2 corresponding to the B layer before stretching). The surface of the B layer usually serves as a bonding surface for bonding the multilayer film according to the present invention to another member. By elevating hydrophilicity of this surface, a remarkable improvement in adhesiveness of the multilayer film according to the present invention to another member can be achieved.

Examples of the surface hydrophilization treatment to the B layer may include corona discharge treatment, plasma treatment, saponification treatment, and ultraviolet irradiation treatment. Among these treatments, corona discharge treatment and plasma treatment are preferable, and corona discharge treatment is particularly preferable from the viewpoint of, e.g., treatment efficiency. As the plasma treatment, atmospheric plasma treatment is preferable.

In the surface hydrophilization treatment, it is desirable that the average water contact angle on the surface of the B layer is adjusted to preferably 70° or smaller, more preferably 60° or smaller, and particularly preferably 50° or smaller, and usually 20° or larger. The standard deviation of water contact angles is preferably from 0.01° to 5°. When the water contact angle on the surface of the B layer is within the aforementioned range, the multilayer film according to the present invention can firmly adhere to another member such as a polarizer.

The water contact angle is measured by the θ/2 method using a contact angle meter.

The average water contact angle is obtained by, e.g., measuring water contact angles at 20 points randomly selected from an area of 100 cm$^2$ on the surface of the B layer that has been subjected to the surface hydrophilization treatment, and then calculating arithmetic average of the measured values. The standard deviation of the water contact angles is calculated from the measured contact angles. With the hydrophilization treatment, a functional group such as hydroxy, carboxyl, carbonyl, amino, and sulfonic groups can be introduced to the surface of the B layer.

The electrode structure of a corona discharge treatment apparatus is preferably a wire structure, a flat structure, or a roll structure. It is preferable to perform the treatment with a dielectric body interposed between the film to be treated and an electrode for achieving uniform discharge. Examples of the material for the electrode may include a metal material such as iron, copper, aluminum, or stainless steel. Examples of the shape of the electrode may include a thin-sheet shape, a knife-edge shape, or a brush shape.

The dielectric body preferably has a relative dielectric constant of 10 or larger. Each electrode is preferably sandwiched by dielectric bodies. Examples of the material of the dielectric body may include ceramic; plastics such as silicone rubber, polytetrafluoroethylene, and polyethylene terephthalate; glass; quartz; silicon dioxide; metallic oxides such as aluminum oxide, zirconium dioxide, and titanium dioxide; and compounds such as barium titanate. In particular, placement of an interposing solid dielectric body having a relative dielectric constant of 10 or larger (at 25° C.) is advantageous since therewith high-speed corona discharge at low discharge voltage can be achieved. Examples of the solid dielectric body having relative dielectric constant of 10 or larger may include metallic oxides such as zirconium dioxide and titanium dioxide; oxides such as barium titanate; and silicone rubber. The thickness of the dielectric body is preferably from 0.3 mm to 1.5 mm. When the thickness is too small, dielectric breakdown is likely to occur, whereas when the thickness is too large, a larger voltage needs to be applied, which may reduce efficiency.

The interval between the film to be treated and the electrode is preferably from 0.5 mm to 10 mm. When the separation is less than 0.5 mm, only a thin film can pass through the gap between the electrodes. When the subject film has a thick portion such as a seam, the thick portion hits the electrode upon passing through the gap between the electrodes, and the film may be damaged. When the separation exceeds 10 mm, the application voltage is elevated, and the power source unit therefor becomes large and the discharge may become in a streamer form.

The output power of the corona discharge treatment is preferably set such that the subject surface is treated with least damage. Specifically, the output power is preferably 0.02 kW or more and more preferably 0.04 kW or more, and is preferably 5 kW or less and more preferably 2 kW or less. It is preferable to perform the corona discharge treatment a plurality of times with a lowest possible output power within the aforementioned range.

The density of the corona discharge treatment is preferably adjusted such that the average water contact angle on the corona-treated surface of the layer 1 falls within a range of usually 20° to 70° and preferably 20° to 50°, and the standard deviation of the water contact angles falls within a range of 0.01° to 5°. Specifically, the density of the corona discharge treatment is preferably 1 W·min/m$^2$ or more, more preferably 5 W·min/m$^2$ or more, and particularly preferably 10 W·min/m$^2$ or more and is preferably 1000 W·min/m$^2$ or less, more preferably 500 W·min/m$^2$ or less, and particularly preferably 300 W·min/m$^2$ or less. When the treatment density is too low, application property of the material Y is prone to be damaged. When the treatment density is too high, the corona-treated surface may be damaged, and its adhesiveness is likely to decrease.

The frequency of the corona discharge treatment is preferably 5 kHz or more and more preferably 10 kHz or more and is preferably 100 kHz or less and more preferably 50 kHz or less. When the frequency is too low, uniformity of the corona discharge treatment may degrade, which may cause corona discharge treatment unevenness. Although too high frequency does not cause any problems in high-power corona discharge treatment, too high frequency may impede stable operation in low-power corona discharge treatment, and may thus cause treatment unevenness.

When a casing is provided around the electrodes and an inert gas is introduced thereinto to apply the gas onto the electrodes, the discharge can be generated in more minute state in the corona discharge treatment. Examples of the inert gas may include helium, argon, and nitrogen. As the inert gas, one type thereof may be solely used, and two or more types thereof may be used in combination at any ratio.

When plasma treatment is conducted as the surface hydrophilization treatment, examples thereof may include glow discharge treatment and flame plasma treatment. As the glow discharge treatment, vacuum glow discharge treatment performed in a vacuum environment and atmospheric glow discharge treatment performed at an atmospheric pressure are both available. From the viewpoint of productivity, atmospheric glow discharge treatment performed at an atmospheric pressure is preferable. The atmospheric pressure is in a range from 700 to 780 Torr.

The glow discharge treatment is a treatment wherein the film to be treated is placed between electrodes facing each other, plasma-excitable gas is introduced into the apparatus, and a high-frequency voltage is applied to the electrodes. This process plasma-excites the gas and causes glow discharge between the electrodes. As a result of this treatment, treated surface exhibits increased hydrophilicity.

The plasma-excitable gas is a gas that is plasma-excited under the aforementioned conditions. Examples of the plasma-excitable gas may include noble gases such as argon, helium, neon, krypton, and xenon; nitrogen; carbon dioxide; fluorine compounds such as tetrafluoromethane and mixtures thereof; and mixture gas of an inert gas such as argon or neon and a reactive gas that is capable of providing a polar functional group such as a carboxyl group, a hydroxy group, and a carbonyl group. As the plasma-excitable gas, one type thereof may be solely used, and two or more types thereof may be used in combination at any ratio.

The frequency of the high-frequency voltage in the plasma treatment is preferably within a range of 1 kHz to 100 kHz, and the voltage is preferably set such that the magnitude of the electric field between the electrodes in application of the voltage falls within 1 kV/cm to 100 kV/cm.

When saponification treatment is conducted as the surface hydrophilization treatment, alkaline saponification treatment is preferable. Examples of the methods of the alkaline saponification may include an immersion method and an alkaline solution application method. From the viewpoint of productivity, the immersion method is preferable.

In the immersion method of the saponification treatment, the film to be treated is immersed in an alkaline solution under an appropriate condition and the entire surface of the film having alkali reactivity is saponified. The immersion method requires no special equipment, and is thus preferable from the viewpoint of cost efficiency. The alkaline solution is preferably an aqueous sodium hydroxide solution. The concentration of the alkaline solution is preferably 0.5 mol/l or more and more preferably 1 mol/l or more and is preferably 3 mol/l or less and more preferably 2 mol/l or less. The temperature of the alkaline solution is preferably 25° C. or more and more preferably 30° C. or more and is preferably 70° C. or less and more preferably 60° C. or less. For setting the average water contact angle and the standard deviation of water contact angles on the alkali-treated surface within a desired range, e.g., immersion time is appropriately adjusted.

After the immersion in the alkaline solution, washing with water or immersing in dilute acid is preferably performed for neutralizing alkaline components, so that no alkaline components remain on the treated film.

When the ultraviolet irradiation treatment is conducted as the surface hydrophilization treatment, the wavelength of the ultraviolet ray for the irradiation is usually 100 to 400 nm. The output value of a lamp as the ultraviolet source is usually 120 W or more and preferably 160 W or more, and is preferably 240 W or less and more preferably 200 W or less. The irradiation amount of the ultraviolet ray to the subject in terms of total amount of cumulative intensity of ultraviolet ray is preferably 100 mJ/cm$^2$ or more, more preferably 200 mJ/cm$^2$ or more, and particularly preferably 300 mJ/cm$^2$ or more and is preferably 2000 mJ/cm$^2$ or less, more preferably 1500 mJ/cm$^2$ or less, and particularly preferably 1000 mJ/cm$^2$ or less. The total amount of cumulative intensity of ultraviolet ray is determined by intensity of the ultraviolet lamp and the speed of production line (moving speed of the film), and is measured by, e.g., a cumulative ultraviolet irradiation intensity meter (EYEUV Meter UVPF-A1 manufactured by Eye Graphics Co., Ltd.).

The method for producing the multilayer film may also be a method including a stretching step of stretching the layer 1 to form the A layer, and a step of forming the B layer with the material Y on a surface of the A layer. That is, a stretched film that has been stretched in advance is prepared, and this stretched film corresponds to the A layer on which the B layer is formed using the material Y. In this method, the A layer already has a predetermined phase difference. Therefore, it is usually preferable that the phase difference given to the A layer before the step of forming the B layer is kept in the resulting multilayer film product. Accordingly, the heating temperature in the step of forming the B layer is preferably set such that no orientation relaxation occurs in the A layer. Specifically, the heating temperature is preferably (Tg−50° C.) or higher and more preferably (Tg−40° C.) or higher, and is preferably (Tg+60° C.) or lower and more preferably (Tg+50° C.) or lower, where Tg is the glass transition temperature of a material constituting the substrate film.

<1.3. Other Properties and Shape of Multilayer Film>

The multilayer film according to the present invention usually exhibits high adhesiveness to another film such as a polarizer film. Specifically, the surface of the B layer exhibits high adhesiveness. Although not specifically determined, the factor that brings about this high adhesiveness is assumed as follows, according to the studies conducted by the inventors. That is, the polymer that constitutes the B layer has a low glass transition temperature, a low storage modulus, and a high loss modulus. Therefore, the B layer is easily deformable, and the deformation of the B layer requires energy. It is assumed that this brings about improvement in adhesiveness.

The total light transmittance of the multilayer film is preferably 85% or more and more preferably 90% or more for stably exhibiting function as an optical member. The light transmittance may be measured by a spectrophotometer (UV/VIS/NIR spectrophotometer "V-570" manufactured by JASCO Corporation) in accordance with JIS K0115.

The haze of the multilayer film is preferably 1% or less, more preferably 0.8% or less, and particularly preferably 0.5% or less. By keeping the haze at a low value, clearness of the displaying image of the display device into which the multilayer film is incorporated can be improved. The haze value referred to herein is an average value of values measured at five spots using a haze meter "NDH-300A" manufactured by Nippon Denshoku Kogyo Co., Ltd. in accordance with JIS K7361-1997.

The in-plane retardation Re and the retardation Rth in the thickness direction of the multilayer film may be appropriately set depending on the applications of the multilayer film. Specifically, the in-plane retardation Re is preferably 50 nm or more, and is preferably 200 nm or less. Specifically, the retardation Rth in the thickness direction is preferably 50 nm or more, and is preferably 300 nm or less.

The fluctuation in the in-plane retardation Re of the multilayer film is preferably within 10 nm, more preferably within 5 nm, and particularly preferably within 2 nm. By keeping the fluctuation in the in-plane retardation Re within the aforementioned range, a liquid crystal display device including the multilayer film as the phase-difference film can obtain a good display quality. The fluctuation in the in-plane retardation Re referred to herein is a difference between the maximum and the minimum values of the in-plane retardation Re measured along the width direction of the multilayer film at the light incidence angle of 0° (i.e., the direction of light is perpendicular to the principal surface of the multilayer film).

The content of the residual volatile components in the multilayer film is preferably 0.1% by weight or less, more preferably 0.05% by weight or less, and particularly preferably 0.02% by weight or less. By keeping the amount of the residual volatile components within the aforementioned range, the multilayer film can obtain stable optical properties that will not change over the lapse of time. Further, size stability of the multilayer film can be improved. Moreover, degradation of the polarization plate and the liquid crystal display device that include the multilayer film according to the present invention can be suppressed, and the display screen can be stably kept in a good state for a long period of time.

The volatile components are components contained in minor amounts in the layer and having a molecular weight of 200 or smaller, and may be, e.g., residual monomer and residual solvent. The content of the volatile components in the layer may be quantified in terms of a sum of the the substances having a molecular weight of 200 or smaller contained in the layer, by the analysis of the layer to be measured using gas chromatography.

The total thickness of the multilayer film is preferably 8 μm or more, more preferably 9 μm or more, and particularly preferably 10 μm or more and is preferably 250 μm or less, more preferably 200 μm or less, and particularly preferably 150 μm or less. When the total thickness of the multilayer film is larger than the lower limit of the aforementioned range, the multilayer film can exhibit an enhanced mechanical strength. When the total thickness of the multilayer film is smaller than the upper limit thereof, the multilayer film itself can be thin.

The thickness unevenness of the multilayer film is preferably 3 μm or less and more preferably 2 μm or less, as it may affect the roll-up capability. The thickness unevenness referred to herein is the difference between the maximum thickness and the minimum thickness of the multilayer film.

It is preferable that the multilayer film is a long-length film. The long-length film is a film having a length of about five or more times longer than the width of the film. The long-length film preferably has a length of 10 or more times longer than the width of the film. Specifically, the length is such an extent that the film is wound in a roll for storage or transport. The preferable procedure for forming the long-length multilayer film is that a long-length A layer is prepared, and then is continuously drawn while the material Y is provided on the surface of the A layer by, e.g., application process, to continuously form a B layer. The upper limit of the ratio of the length with respect to the width of the multilayer film is not limited to any particular value, but usually, may be 5000 or less.

The width of the multilayer film is preferably 700 mm or more, more preferably 1000 mm or more, and particularly preferably 1200 mm or more and is preferably 2500 mm or less, more preferably 2200 mm or less, and particularly preferably 2000 mm or less.

<2. Polarization Plate>

The polarization plate according to the present invention is a laminate including the aforementioned multilayer film and a polarizer film. As the polarizer film, a film that allows light of a specific linear polarization to pass therethrough, and absorb or reflects light of another polarization that is perpendicular to the specific linear polarization may be used. Examples of the polarizer film may include a film that is composed of any of vinyl alcohol-based polymers such as polyvinyl alcohol and partially formalized polyvinyl alcohol, that has been subjected to dyeing with a dichroic substance such as iodine or other dichroic dyes, and stretching, cross-linking, and other suitable treatments in a suitable order and manner. In particular, a polarizer film that contains polyvinyl alcohol exhibits good adhesiveness to the multilayer film, and thus preferable. The thickness of the polarizer film is usually 5 to 80 μm.

The multilayer film may be bonded to one surface or both surfaces of the polarizer film. The number of multilayer films included in a polarization plate may be one, and may also be two or more. An adhesive agent may be used if necessary upon laminating the polarizer film and the multilayer film. If necessary, an optional member may be interposed between the polarizer film and the multilayer film. However, for increasing adhesiveness between the polarizer film and the multilayer film, it is preferable to bond the surface on the B layer of the multilayer film and the polarizer film. The polarization plate according to the present invention, therefore, preferably includes the polarizer film, the B layer, and the A layer in this order.

A protective film may be bonded to one or both of the surfaces of the polarizer film via a suitable adhesion layer for protecting the polarizer film. As the protective film, a resin film that has good transparency, mechanical strength, heat stability and moisture barrier property is preferable. Examples of resins constituting the resin film may include a resin containing an acetate polymer such as triacetyl cellulose, a resin containing a polymer that has an alicyclic structure, a resin containing a polyester such as a polyolefin, a polycarbonate and a polyethylene terephthalate, a polyvinyl chloride, a polystyrene, a polyacrylonitrile, a polysulfone, a polyether sulfone, a polyamide, a polyimide, and an acrylic polymers.

Moreover, another phase-difference layer may be provided to a surface of the multilayer film that includes the A layer and the B layer, wherein the surface does not have a polarizer film. This phase-difference layer may be of a single layer, and may also include a plurality of layers. By arranging the multilayer film and the phase-difference film to have a desired optic axes relationship, visibility of a liquid crystal display device, which will be described later, can be increased.

<3. Liquid Crystal Display Device>

The liquid crystal display device according to the present invention includes the aforementioned multilayer film. The multilayer film includes the A layer and the B layer, and can compensate the birefringence to a higher degree. Thus, provision of the multilayer film to the liquid crystal display device can increase a variety of properties of the liquid crystal display device.

The liquid crystal display device usually includes a liquid crystal panel including a light source side polarization plate, a liquid crystal cell, and an image-displaying side polarization plate disposed in this order, and a light source that cast light on the liquid crystal panel. The multilayer film according to the present invention may be used as a phase-difference film and interposed, e.g., between the liquid crystal cell and the light source side polarization plate or between the liquid crystal cell and the image-displaying side polarization plate. This configuration can increase visibility of the liquid crystal display device to a larger extent.

Examples of the driving mode of the liquid crystal cell may include an in-plane switching (IPS) mode, a vertical alignment (VA) mode, a multi-domain vertical alignment (MVA) mode, a continuous pinwheel alignment (CPA) mode, a hybrid alignment nematic (HAN) mode, a twisted nematic (TN) mode, a super twisted nematic (STN) mode, and an optical compensated bend (OCB) mode.

<4. Other Applications>

The aforementioned multilayer film can be easily produced, and can also compensate birefringence to a higher degree, and thus can be used by itself or in combination with another member. For example, the multilayer film may be used solely by itself as a phase-difference plate or a viewing angle compensation film. Further, e.g., the multilayer film may be used in combination with a circularly polarizer film to form a brightness enhancing film. These configurations may be applied to, e.g., liquid crystal display devices, organic electroluminescent display devices, plasma display devices, field emission display (FED) devices, and surface-conduction electron-emitter display (SED) devices.

EXAMPLES

The present invention will be specifically described hereinbelow referring to Examples. However, the present invention is not limited to the following Examples, and may be implemented with any modifications without departing from the scope of the claims and equivalents thereto.

In the following description, "%" and "part" describing quantities are on a weight basis unless otherwise specified. The operations in the following description were performed at normal temperature and normal pressure unless otherwise specified.

<Method for Evaluation>

(Method for Measuring Glass Transition Temperature of Polymer)

A single-layer film made of the sample polymer was prepared. A dynamic viscoelastic analyzer (Rheogel-E4000 manufactured by UBM Co. Ltd.) was used for measuring the glass transition temperature of the polymer.

(Method for Measuring Thickness)

The thickness of the A layer and the B layer, and the total thickness of the multilayer film were measured by the following method. The refractive index of each layer of the sample multilayer film was measured with an ellipsometer ("M-2000" manufactured by J. A. Woollam Co., Inc.). The film thickness was measured with a spectroscopic reflectometer ("MCPD-9800" manufactured by Otsuka Electronics Co, Ltd.) using the measured refractive indices.

(Method for Measuring Planar Orientation Coefficient)

The refractive indices nx, ny, and nz of the outermost layer (A layer) of the multilayer film were measured with a prism coupler refractometer (Model 2010 manufactured by Metricon Corporation) at a wavelength of 590 nm, and the planar orientation coefficient was calculated in accordance with the following expression:

$$P=(nx+ny)/2-nz$$

Where nx denotes the maximum in-plane refractive index, ny denotes a refractive index in a direction orthogonal to nx, and nz denotes a refractive index in the thickness direction.

(Method for Measuring Loss Modulus and Storage Modulus)

The loss modulus and the storage modulus of the A layer and the B layer of the sample multilayer film were measured with TI 950 TriboIndenter manufactured by Hysitron, Inc. under the conditions of room temperature, 300 Hz, and an indentation depth of 50 nm. As the indentation depth was set to 50 nm, information only on the outermost surface was obtained. That is, Ea' and Ea" were obtained by the measurement on the A layer of the multilayer film, and Eb' and Eb" were obtained by the measurement on the B layer of the multilayer film.

(Method for Measuring Peel Strength)

An unstretched film (glass transition temperature: 160° C., thickness: 100 µm, manufactured by ZEON Corporation) composed of a resin containing a norbornene polymer was prepared as a substitute for a polarization plate. A surface of the multilayer film and a surface of the unstretched film were corona-treated. Adhesive agent was applied onto the corona-treated surfaces of the multilayer film and the unstretched film, and the adhesive-applied surfaces were laminated. As the adhesive agent, a UV adhesive agent was used. A sample film including the multilayer film and the unstretched film was thus obtained.

Subsequently, the sample film was cut into a strip with a width of 25 mm, and the surface of the multilayer film side of the strip was bonded to a surface of a glass slide with an adhesive agent. As the adhesive agent, a double-sided adhesive tape (manufactured by Nitto Denko Corporation, product number "CS9621") was used.

The unstretched film was gripped by a tip of a force gauge and pulled in the normal direction of the surface of the glass slide, to conduct a 90 degree peel test. As the force measured upon peeling the unstretched film is the force required to peel the unstretched film from the multilayer film, the level of this force was measured as the peel strength.

The measured peel strength was evaluated in accordance with the following criteria.

Good: Peel strength of 0.5 N or more, or fracture of the material occurs before peeling.

Poor: Peel strength of less than 0.5 N.

(Supplement to Method for Measuring Peel Strength)

In the method for measuring the peel strength, an unstretched film composed of a resin that contains a norbornene polymer was used in place of a polarization plate. To determine the adequacy of the use of the unstretched film in place of the polarization plate in the measurement of peel strength, the inventors conducted the following experiment on the multilayer film obtained in Example 1.

In place of using the unstretched film composed of a resin that contains a norbornene polymer, the multilayer film was bonded to a surface of a polarizer film, and a triacetyl cellulose film was bonded to the other surface of the polarizer film in accordance with Example 1 described in Japanese Patent Application Laid-open No. 2005-070140 A, and the 90 degree peel test was conducted. That is, firstly, a polarizer film and an adhesive agent described in Japanese Patent Application Laid-open No. 2005-070140 A were prepared. The corona-treated surface of the multilayer film was bonded to a surface of the prepared polarizer film with the adhesive agent. To the other surface of the polarizer film, a triacetyl cellulose film was bonded with the adhesive agent. The bonded film was dried at 80° C. for 7 minutes to cure the adhesive agent, to thereby obtain a sample film. The sample film was subjected to the 90 degree peel test.

As a result of the 90 degree peel test, the same result was obtained as in a case of using, in place of a polarization plate, an unstretched film composed of a resin that contains a norbornene polymer. Thus, the results of the following Examples and Comparative Examples in which an unstretched film composed of a resin that contains a norbornene polymer was used in place of a polarization plate are adequate.

Example 1

(1-1. Production of Film Composed of a Layer)

Pellets of a resin containing a norbornene polymer (glass transition temperature: 137° C., "ZEONOR1420R" manufactured by ZEON Corporation) were dried at 100° C. for 5 hours. The dried resin pellets were fed to a single screw extruder. The resin was melt in the extruder, and passed through a polymer feed pipe and a polymer filter. The resin was then extruded from a T-shaped die onto a cast drum in a sheet shape, and cooled. A film having a thickness of 50 μm and a width of 675 mm was thus obtained.

(1-2. Preparation of Water-Based Resin Composition 1)

An aqueous dispersion of a polyurethane named SUPERFLEX (carbonate-based polyurethane, glass transition temperature: −35° C., manufactured by Daiichi Kogyo Seiyaku Co., Ltd.) that is an aqueous dispersion of a polymer containing a polar group as a functional group (polymer Y1) was weighed such that the polyurethane contained therein was 100 parts. With this dispersion, 20 parts of an epoxy compound named Denacol EX-521 (manufactured by Nagase ChemteX Co., Ltd.), 5 parts of dihydrazide adipate and water were mixed. Thereby, a liquid state water-based resin composition 1 containing 20% solid content was obtained as the material Y.

(1-3. Method for Producing Multilayer Film)

Electrical discharge treatment was conducted on a surface of the film obtained in (1-1) using a corona treatment apparatus (manufactured by Kasuga Denki, Inc.) at an output power of 500 W, with an electrode length of 1.35 m, and at a conveying speed of 15 m/min. To the surface of the film obtained in (1-1) treated with the electrical discharge treatment, the liquid state water-based resin composition 1 was applied using a roll coater such that the water-based resin composition 1 formed a dry film having a thickness of 1.26 μm. Subsequently, the film obtained in (1-1) was continuously and uniaxially stretched, with both ends thereof held by clips, in the width direction using a tenter type crosswise stretching machine at a stretching temperature of 152° C. and a stretching ratio of 2.5 times. After stretching, both ends of the stretched film were removed by cutting. Thereby a drying step of drying the water-based resin composition 1 that had been applied onto the film and a stretching step of stretching the film were simultaneously performed, and the B layer was formed on a surface of the film obtained in (1-1).

A multilayer film 1 was thus obtained having an A layer thickness (Ta) of 20 μm, a B layer thickness (Tb) of 0.5 μm, an A layer planar orientation coefficient (P) of 0.004, an A layer loss modulus (Ea") of 0.36 GPa, a B layer loss modulus (Eb") of 0.41 GPa, an A layer storage modulus (Ea') of 5.46 GPa, and a B layer storage modulus (Eb') of 3.51 GPa. The peel strength measured in the peel test was 0.5 N or more, which was evaluated as good peel strength.

Example 2

In step (1-3) of Example 1, the application thickness of the liquid state water-based resin composition 1 obtained in step (1-2) was changed such that the water-based resin composition 1 formed a dry film having a thickness of 0.6 μm. Except for the aforementioned change, the same operation as in Example 1 was performed. A multilayer film 2 was thus obtained having an A layer thickness of 20 μm, a B layer thickness of 0.23 μm, an A layer planar orientation coefficient of 0.004, an A layer loss modulus of 0.36 GPa, a B layer loss modulus of 0.4 GPa, an A layer storage modulus of 5.46 GPa, and a B layer storage modulus of 3.49 GPa. The peel strength measured in the peel test was 0.5 N or more, which was evaluated as good peel strength.

Example 3

In step (1-3) of Example 1, the application thickness of the liquid state water-based resin composition 1 obtained in step (1-2) was changed such that the water-based resin composition 1 formed a dry film having a thickness of 2.5 μm. Except for the aforementioned change, the same operation as in Example 1 was performed. A multilayer film 3 was thus obtained having an A layer thickness of 20 μm, a B layer thickness of 1 μm, an A layer planar orientation coefficient of 0.004, an A layer loss modulus of 0.36 GPa, a B layer loss modulus of 0.47 GPa, an A layer storage modulus of 5.46 GPa, and a B layer storage modulus of 3.47 GPa. The peel strength measured in the peel test was 0.5 N or more, which was evaluated as good peel strength.

Example 4

In step (1-1) of Example 1, the thickness of the resulting film was changed from 50 μm to 115 μm by changing the rotation rate of the extruder. In step (1-3) of Example 1, the application thickness of the liquid state water-based resin composition 1 obtained in step (1-2) was changed such that the water-based resin composition 1 formed a dry film having a thickness of 0.6 μm. Further, the stretching temperature was changed from 152° C. to 156° C., and the stretching ratio was changed from 2.5 times to 2.9 times. Except for the aforementioned changes, the same operation as in Example 1 was performed. A multilayer film 4 was thus obtained having an A layer thickness of 40 μm, a B layer thickness of 0.2 μm, an A layer planar orientation coefficient of 0.003, an A layer loss modulus of 0.38 GPa, a B layer loss modulus of 0.4 GPa, an A layer storage modulus of 5.46 GPa, and a B layer storage modulus of 4.16 GPa. The peel strength measured in the peel test was 0.5 N or more, which was evaluated as good peel strength.

Example 5

In step (1-1) of Example 1, the thickness of the resulting film was changed from 50 μm to 80 μm by changing the rotation rate of the extruder. In step (1-3) of Example 1, the application thickness of the liquid state water-based resin composition 1 obtained in step (1-2) was changed such that the water-based resin composition 1 formed a dry film having a thickness of 2.2 μm. Further, the stretching temperature was changed from 152° C. to 153° C., and the stretching ratio was changed from 2.5 times to 4.5 times.

Except for the aforementioned changes, the same operation as in Example 1 was performed. A multilayer film 5 was thus obtained having an A layer thickness of 18 μm, a B layer thickness of 0.5 μm, an A layer planar orientation coefficient of 0.005, an A layer loss modulus of 0.36 GPa, a B layer loss modulus of 0.41 GPa, an A layer storage modulus of 5.57 GPa, and a B layer storage modulus of 3.51 GPa. The peel strength measured in the peel test was 0.5 N or more, which was evaluated as good peel strength.

Example 6

In step (1-1) in Example 1, the thickness of the resulting film was changed from 50 μm to 63 μm by changing the rotation rate of the extruder. In step (1-3) of Example 1, the application thickness of the liquid state water-based resin composition 1 obtained in step (1-2) was changed such that the water-based resin composition 1 formed a dry film having a thickness of 2.3 μm. Further, the stretching temperature was changed from 152° C. to 153° C., and the stretching ratio was changed from 2.5 times to 4.6 times.

Except for the aforementioned changes, the same operation as in Example 1 was performed. A multilayer film 6 was thus obtained having an A layer thickness of 13 μm, a B layer thickness of 0.5 μm, an A layer planar orientation coefficient of 0.006, an A layer loss modulus of 0.33 GPa, a B layer loss modulus of 0.41 GPa, an A layer storage modulus of 5.57 GPa, and a B layer storage modulus of 3.51 GPa. The peel strength measured in the peel test was 0.5 N or more, which was evaluated as good peel strength.

Example 7

In step (1-1) of Example 1, the thickness of the resulting film was changed from 50 μm to 70 μm by changing the rotation rate of the extruder. In step (1-3) of Example 1, the application thickness of the liquid state water-based resin composition 1 obtained in step (1-2) was changed such that the water-based resin composition 1 formed a dry film having a thickness of 1.1 μm. Further, the stretching temperature was changed from 152° C. to 147° C., the stretching ratio was changed from 2.5 times to 2.2 times, and the stretching was changed from the crosswise uniaxial stretching to 45 degree diagonal stretching.

Except for the aforementioned changes, the same operation as in Example 1 was performed. A multilayer film 7 was thus obtained having an A layer thickness of 32 μm, a B layer thickness of 0.5 μm, an A layer planar orientation coefficient of 0.005, an A layer loss modulus of 0.38 GPa, a B layer loss modulus of 0.41 GPa, an A layer storage modulus of 5.46 GPa, and a B layer storage modulus of 3.51 GPa. The peel strength measured in the peel test was 0.5 N or more, which was evaluated as good peel strength.

Example 8

In step (1-2) of Example 1, the aqueous dispersion of the polyurethane SUPERFLEX (carbonate-based polyurethane resin, glass transition temperature: −35° C., manufactured by Daiichi Kogyo Seiyaku Co., Ltd.) was changed to an aqueous dispersion of a polyurethane named Adeka Bontighter SPX-672 (carbonate-based polyurethane, glass transition temperature: −10° C., manufactured by ADEKA Co., Ltd.). In step (1-3) of Example 1, the application thickness of the liquid state water-based resin composition 1 obtained in step (1-2) was changed such that the water-based resin composition 1 formed a dry film having a thickness of 1.4 μm.

Except for the aforementioned changes, the same operation as in Example 1 was performed. A multilayer film 8 was thus obtained having an A layer thickness of 20 μm, a B layer thickness of 0.55 μm, an A layer planar orientation coefficient of 0.004, an A layer loss modulus of 0.36 GPa, a B layer loss modulus of 0.4 GPa, an A layer storage modulus of 5.46 GPa, and a B layer storage modulus of 3.51 GPa. The peel strength measured in the peel test was 0.5 N or more, which was evaluated as good peel strength.

Example 9

In step (1-1) of Example 1, the resin containing a cycloolefin polymer was changed from a "ZEONOR" manufactured by ZEON Corporation having a glass transition temperature of 137° C. to a "ZEONOR" manufactured by ZEON Corporation having a glass transition temperature of 160° C. The stretching temperature was changed from 152° C. to 175° C.

Except for the aforementioned changes, the same operation as in Example 1 was performed. A multilayer film 9 was thus obtained having an A layer thickness of 20 μm, a B layer thickness of 0.5 μm, an A layer planar orientation coefficient of 0.004, an A layer loss modulus of 0.36 GPa, a B layer loss modulus of 0.41 GPa, an A layer storage modulus of 5.46 GPa, and a B layer storage modulus of 3.51 GPa. The peel strength measured in the peel test was 0.5 N or more, which was evaluated as good peel strength.

Example 10

In step (1-2) of Example 1, the aqueous dispersion of the polyurethane SUPERFLEX (carbonate-based polyurethane resin, glass transition temperature: −35° C., manufactured by Daiichi Kogyo Seiyaku Co., Ltd.) was changed to an aqueous dispersion of a polyurethane SUPERFLEX (carbonate-based polyurethane resin, glass transition temperature: −21° C., manufactured by Daiichi Kogyo Seiyaku Co., Ltd.).

Except for the aforementioned change, the same operation as in Example 1 was performed. A multilayer film 10 was thus obtained having an A layer thickness of 20 μm, a B layer thickness of 0.5 μm, an A layer planar orientation coefficient of 0.004, an A layer loss modulus of 0.36 GPa, a B layer loss modulus of 0.41 GPa, an A layer storage modulus of 5.46 GPa, and a B layer storage modulus of 3.51 GPa. The peel strength measured in the peel test was 0.5 N or more, which was evaluated as good peel strength.

Example 11

In step (1-2) of Example 1, the aqueous dispersion of the polyurethane SUPERFLEX (carbonate-based polyurethane resin, glass transition temperature: −35° C., manufactured by Daiichi Kogyo Seiyaku Co., Ltd.) was changed to an aqueous dispersion of a polyurethane SUPERFLEX (carbonate-based polyurethane resin, glass transition temperature: −10° C., manufactured by Daiichi Kogyo Seiyaku Co., Ltd.).

Except for the aforementioned change, the same operation as in Example 1 was performed. A multilayer film 11 was thus obtained having an A layer thickness of 20 μm, a B layer thickness of 0.5 μm, an A layer planar orientation coefficient of 0.004, an A layer loss modulus of 0.2 GPa, a B layer loss modulus of 0.32 GPa, an A layer storage modulus of 5.46 GPa, and a B layer storage modulus of 3.51 GPa. The peel strength measured in the peel test was 0.5 N or more, which was evaluated as good peel strength.

Example 12

The film obtained in step (1-1) in Example 1 was continuously and uniaxially stretched, with both ends thereof held by clips, in the width direction using a tenter type crosswise stretching machine at a stretching temperature of 152° C. and a stretching ratio of 2.5 times. After stretching, both ends of the stretched film were removed by cutting. An A layer film was thus obtained.

Subsequently, electrical discharge treatment was conducted on a surface of the A layer film using a corona treatment apparatus (manufactured by Kasuga Denki, Inc.) at an output power of 500 W, with an electrode length of 1.35 m, and at a conveying speed of 15 m/min.

To the surface of the A layer film treated with the electrical discharge treatment, the liquid state water-based resin composition 1 obtained in step (1-2) in Example 1 was applied using a roll coater such that the water-based resin composition 1 formed a dry film having a thickness of 0.6 μm.

The film was passed through a dryer oven at 90° C. to dry the water-based resin composition 1 layer, to thereby form a B layer.

A multilayer film 12 was thus obtained having an A layer thickness (Ta) of 20 μm, a B layer thickness (Tb) of 0.6 μm, an A layer planar orientation coefficient (P) of 0.004, an A layer loss modulus (Ea") of 0.18 GPa, a B layer loss modulus (Eb") of 0.2 GPa, an A layer storage modulus (Ea') of 5.36 GPa, and a B layer storage modulus (Eb') of 3.36 GPa. The peel strength measured in the peel test was 0.5 N or more, which was evaluated as good peel strength.

Comparative Example 1

In Example 1, the B layer was not formed and only the A layer was stretched in the stretching step in. Except for the aforementioned change, the same operation as in Example 1 was performed. A single layer film was thus obtained having an A layer thickness of 20 μm, an A layer planar orientation coefficient of 0.004, an A layer loss modulus of 0.33 GPa, and an A layer storage modulus of 5.46 GPa. The peel strength measured in the peel test was less than 0.5 N, which was evaluated as poor peel strength.

Comparative Example 2

In step (1-2) of Example 1, the aqueous dispersion of the polyurethane SUPERFLEX (carbonate-based polyurethane resin, glass transition temperature: −35° C., manufactured by Daiichi Kogyo Seiyaku Co., Ltd.) was changed to an aqueous dispersion of a polyurethane SUPERFLEX (carbonate-based polyurethane resin, glass transition temperature: 41° C., manufactured by Daiichi Kogyo Seiyaku Co., Ltd.).

Except for the aforementioned change, the same operation as in Example 1 was performed. A multilayer film 12 was thus obtained having an A layer thickness of 20 μm, a B layer thickness of 0.5 μm, an A layer planar orientation coefficient of 0.004, an A layer loss modulus of 0.33 GPa, a B layer loss modulus of 0.34 GPa, an A layer storage modulus of 5.46 GPa, and a B layer storage modulus of 4.6 GPa. The peel strength measured in the peel test was less than 0.5 N, which was evaluated as poor peel strength.

<Results>

Results of Examples and Comparative examples are shown in Tables 1 to 3. Meanings of the abbreviations used in the following Tables are as follows.

A/B two layer: Two-layer structure of A layer/B layer
TgA: Glass transition temperature (° C.) of the polymer (A) constituting the A layer
TgB: Glass transition temperature (° C.) of the polymer (B) constituting the B layer
Ta: Thickness (μm) of the A layer
Tb: Thickness (μm) of the B layer
P: Planar orientation coefficient of the A layer
Ea": Loss modulus (GPa) of the A layer
Eb": Loss modulus (GPa) of the B layer
Ea': Storage modulus (GPa) of the A layer
Eb': Storage modulus (GPa) of the B layer

TABLE 1

| Examples | | 1 | 2 | 3 | 4 | 5 | 6 |
|---|---|---|---|---|---|---|---|
| Layer constitution | | A/B two layer | A/B two layer | A/B two layer | A/B two layer | A/B two layer | A/B two layer |
| Glass transition | TgA(° C.) | 137 | 137 | 137 | 137 | 137 | 137 |
| temperature | TgB(° C.) | −35 | −35 | −35 | −35 | −35 | −35 |
| Thickness | Ta(μm) | 20 | 20 | 20 | 40 | 18 | 13 |
| | Tb(μm) | 0.5 | 0.23 | 1 | 0.2 | 0.5 | 0.5 |

TABLE 1-continued

| Examples | | 1 | 2 | 3 | 4 | 5 | 6 |
|---|---|---|---|---|---|---|---|
| | Tb/Ta | 0.025 | 0.012 | 0.050 | 0.005 | 0.028 | 0.038 |
| planar orientation coefficient | P | 0.004 | 0.004 | 0.004 | 0.003 | 0.005 | 0.006 |
| Loss modulus | Ea"(GPa) | 0.36 | 0.36 | 0.36 | 0.38 | 0.36 | 0.33 |
| | Eb"(GPa) | 0.41 | 0.4 | 0.47 | 0.4 | 0.41 | 0.41 |
| Storage modulus | Ea'(GPa) | 5.46 | 5.46 | 5.46 | 5.46 | 5.57 | 5.57 |
| | Eb'(GPa) | 3.51 | 3.49 | 3.47 | 4.16 | 3.51 | 3.51 |
| Peel strength | | Good | Good | Good | Good | Good | Good |

TABLE 2

| Examples | | 7 | 8 | 9 | 10 | 11 | 12 |
|---|---|---|---|---|---|---|---|
| Layer constitution | | A/B two layer | A/B two layer | A/B two layer | A/B two layer | A/B two layer | A/B two layer |
| Glass transition temperature | TgA(° C.) | 137 | 137 | 160 | 137 | 137 | 137 |
| | TgB(° C.) | −35 | −10 | −35 | −21 | −10 | −35 |
| Thickness | Ta(μm) | 32 | 20 | 20 | 20 | 20 | 20 |
| | Tb(μm) | 0.5 | 0.55 | 0.5 | 0.5 | 0.5 | 0.6 |
| | Tb/Ta | 0.016 | 0.025 | 0.025 | 0.025 | 0.025 | 0.03 |
| planar orientation coefficient | P | 0.005 | 0.004 | 0.004 | 0.004 | 0.004 | 0.004 |
| Loss modulus | Ea"(GPa) | 0.38 | 0.36 | 0.36 | 0.36 | 0.2 | 0.18 |
| | Eb"(GPa) | 0.41 | 0.4 | 0.41 | 0.41 | 0.32 | 0.2 |
| Storage modulus | Ea'(GPa) | 5.46 | 5.46 | 5.46 | 5.46 | 5.46 | 5.36 |
| | Eb'(GPa) | 3.51 | 3.51 | 3.51 | 3.51 | 3.51 | 3.36 |
| Peel strength | | Good | Good | Good | Good | Good | Good |

TABLE 3

| | | Comparative Examples | |
|---|---|---|---|
| | | 1 | 2 |
| Layer constitution | | A one layer | A/B two layer |
| Glass transition temperature | TgA(° C.) | 137 | 137 |
| | TgB(° C.) | — | 41 |
| Thickness | Ta(μm) | 20 | 20 |
| | Tb(μm) | — | 0.5 |
| | Tb/Ta | — | 0.025 |
| planar orientation coefficient | P | 0.004 | 0.004 |
| Loss modulus | Ea"(GPa) | 0.33 | 0.33 |
| | Eb"(GPa) | — | 0.34 |
| Storage Modulus | Ea'(GPa) | 5.46 | 5.46 |
| | Eb'(GPa) | — | 4.6 |
| Peel strength | | Poor | Poor |

<Discussion>

As shown in Tables 1 to 3, it was confirmed that, as the multilayer films obtained in Examples appropriately satisfied the desired glass transition temperature, thickness, planar orientation coefficient, loss modulus, and storage modulus, the resulting multilayer films had good adhesiveness over the entire surface.

The invention claimed is:

1. A multilayer film comprising: an A layer composed of a thermoplastic resin; and a B layer disposed on at least one of the surfaces of the A layer,
the B layer being composed of a material Y that contains as a main component a polymer having a glass transition temperature of −50 to 40 ° C. , and
a thickness Ta of the A layer, a thickness Tb of the B layer, a planar orientation coefficient P of the A layer, a loss modulus Ea" of the A layer, a loss modulus Eb" of the B layer, a storage modulus Ea' of the A layer, and a storage modulus Eb' of the B layer satisfying following formulae (1) to (4):

$$2.5 \times 10^{-3} < Tb/Ta < 1.0 \times 10^{-1} \quad (1)$$

$$P > 1.0 \times 10^{-3} \quad (2)$$

$$Eb" > Ea" + 0.01 \text{ GPa} \quad (3)$$

$$Eb' \leq Ea' - 1 \text{ GPa.} \quad (4)$$

2. The multilayer film according to claim 1, wherein the thermoplastic resin contains a polymer having an alicyclic structure.

3. The multilayer film according to claim 1, wherein the polymer contained in the material Y is a polyurethane.

4. The multilayer film according to claim 3, wherein the polyurethane has a carbonate structure in the skeleton structure thereof.

5. The multilayer film according to claim 1, wherein the multilayer film has a two-layer structure having only one A layer and only one B layer.

6. The multilayer film according to claim 1, wherein the material Y is an aqueous emulsion substantially containing no organic solvent.

7. The multilayer film according to claim 1, wherein $$0.01 < Tb/Ta < 0.09 \quad (1)$$

$$P > 2.0 \times 10^{-3} \quad (2)$$

$$Eb" > Ea" + 0.015 \text{ GPa} \quad (3)$$

$$Eb' \leq Ea' - 1.2 \text{ GPa.} \quad (4)$$

8. The multilayer film according to claim 1, wherein the polymer contained in the material Y has a glass transition temperature of −35 to −10° C.

* * * * *